(12) United States Patent
Ramirez et al.

(10) Patent No.: US 11,058,524 B2
(45) Date of Patent: Jul. 13, 2021

(54) DENTAL RESTORATION DESIGN TOOLS

(71) Applicant: James R. Glidewell Dental Ceramics, Inc., Newport Beach, CA (US)

(72) Inventors: Shawn Ramirez, Santa Ana, CA (US); Sergey Nikolskiy, Coto de Caza, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 448 days.

(21) Appl. No.: 15/712,397

(22) Filed: Sep. 22, 2017

(65) Prior Publication Data

US 2018/0085203 A1 Mar. 29, 2018

Related U.S. Application Data

(60) Provisional application No. 62/399,622, filed on Sep. 26, 2016.

(51) Int. Cl.
| | | |
|---|---|---|
| *A61C 13/00* | (2006.01) | |
| *A61C 5/77* | (2017.01) | |
| *G06F 30/00* | (2020.01) | |
| *A61C 9/00* | (2006.01) | |

(52) U.S. Cl.
CPC .......... *A61C 13/0004* (2013.01); *A61C 5/77* (2017.02); *G06F 30/00* (2020.01); *A61C 9/004* (2013.01)

(58) Field of Classification Search
CPC ....... A61C 13/0004; A61C 5/77; A61C 9/004; G06F 17/50; G06F 30/00

USPC .............................................. 703/7
See application file for complete search history.

(56) References Cited

U.S. PATENT DOCUMENTS

| | | | | |
|---|---|---|---|---|
| 5,431,562 A * | 7/1995 | Andreiko | ................ | A61C 7/00 433/24 |
| 5,602,891 A * | 2/1997 | Pearlman | ............... | A61B 6/463 250/363.01 |
| 6,664,986 B1 * | 12/2003 | Kopelman | ........... | A61C 9/0046 715/849 |
| 6,744,914 B1 * | 6/2004 | Rubbert | ................ | A61C 7/146 382/154 |
| 7,134,874 B2 * | 11/2006 | Chishti | ................... | A61C 9/00 |
| 7,156,655 B2 * | 1/2007 | Sachdeva | ................ | A61C 7/00 433/24 |
| 7,476,100 B2 * | 1/2009 | Kuo | ........................ | A61C 7/00 433/6 |
| 8,591,225 B2 * | 11/2013 | Wu | ....................... | G06T 7/0014 433/24 |
| 8,636,509 B2 * | 1/2014 | Miller | ..................... | A61C 7/00 433/24 |
| 9,808,326 B2 * | 11/2017 | Masoud | ................. | A61C 7/002 |
| 9,937,023 B2 * | 4/2018 | Andersson | ........... | A61C 9/0006 |

(Continued)

*Primary Examiner* — Justin C Mikowski
(74) *Attorney, Agent, or Firm* — Charles Fowler

(57) ABSTRACT

A computer-implemented method of designing a dental restoration at a display includes providing a virtual three dimensional representation of at least a portion of the patient's dental situation. The method includes displaying a virtual three dimensional dental restoration model in an alignment with the virtual three dimensional representation. The method also includes providing a design tool selectable to deform at least a portion of the three dimensional dental restoration model. The design tool, when selected, enables a line to be drawn on a surface of the three dimensional dental restoration model.

9 Claims, 22 Drawing Sheets

(56) References Cited

U.S. PATENT DOCUMENTS

| | | | | |
|---|---|---|---|---|
| 2002/0015934 A1* | 2/2002 | Rubbert | ............... | B33Y 50/00 |
| | | | | 433/29 |
| 2005/0089822 A1* | 4/2005 | Geng | ............... | A61C 13/0004 |
| | | | | 433/215 |
| 2005/0271996 A1* | 12/2005 | Sporbert | ............... | A61C 7/00 |
| | | | | 433/24 |
| 2007/0087302 A1* | 4/2007 | Reising | ............... | A61C 7/145 |
| | | | | 433/24 |
| 2009/0068617 A1* | 3/2009 | Lauren | ............... | A61C 13/0004 |
| | | | | 433/213 |
| 2011/0196524 A1* | 8/2011 | Giasson | ............... | A61C 13/0004 |
| | | | | 700/103 |
| 2012/0329008 A1* | 12/2012 | Fishman | ............... | A61C 13/0004 |
| | | | | 433/172 |
| 2014/0316750 A1* | 10/2014 | Jung | ............... | A61C 1/082 |
| | | | | 703/1 |
| 2015/0056576 A1* | 2/2015 | Nikolskiy | ............... | A61C 13/0004 |
| | | | | 433/214 |
| 2017/0231721 A1* | 8/2017 | Akeel | ............... | B29C 64/386 |
| | | | | 433/24 |
| 2017/0348071 A1* | 12/2017 | Jin | ............... | A61C 7/002 |
| 2018/0028294 A1* | 2/2018 | Azernikov | ............... | A61C 13/0004 |
| 2019/0231493 A1* | 8/2019 | Inglese | ............... | A61C 9/0053 |

* cited by examiner

DENTAL RESTORATION DESIGN TOOLS

RELATED APPLICATIONS

This application claims priority to and the benefit of U.S. Provisional Patent Application No. 62/399,622, filed Sep. 26, 2016, the entirety of which is incorporated herein by reference in its entirety.

TECHNICAL FIELD

The disclosure relates generally to the field of dental restoration design, and specifically to dental restoration design tools.

BACKGROUND

Recently, CAD/CAM dentistry (Computer-Aided Design and Computer-Aided Manufacturing in dentistry) has provided a broad range of dental restorations, including crowns, veneers, inlays and onlays, fixed bridges, dental implant restorations, and orthodontic appliances. In a typical CAD/CAM based dental procedure, a treating dentist can prepare the tooth being restored either as a crown, inlay, onlay or veneer. The prepared tooth and its surroundings are then imaged by a three dimensional (3D) imaging camera and stored as a three dimensional (3D) digital model. Alternatively, a dentist can obtain an impression of the tooth to be restored and the impression may be scanned directly, or formed into a physical model to be scanned, and stored as a three dimensional (3D) digital model.

Current dental restoration design software may display the 3D digital model on the computer as a virtual 3D dental representation of the patient's dentition and then approximate the restoration shape using comparisons to surrounding teeth. The practitioner then refines the restoration model using 3D CAD software. When the design phase is complete, the information is sent to a milling unit which mills the actual restoration from a solid block of material using one or more machine tools. Therefore, useful design tools in the software can help the practitioner to refine the restoration model more easily and fast. For example, the 3D dental restoration model can be rotated and viewed from different directions, zoomed in and out, and displayed in different colors or grey scales, etc.

SUMMARY

A computer-implemented method of designing a dental restoration at a display is disclosed. Embodiments of the method comprise providing a virtual three dimensional representation of at least a portion of the patient's dental situation. The embodiments of the method also comprise displaying a virtual three dimensional dental restoration model in an alignment with the virtual three dimensional representation. The embodiments of the method further comprise providing a design tool selectable to deform at least a portion of the three dimensional dental restoration model. The design tool, when selected, enables a line to be drawn on a surface of the three dimensional dental restoration model.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Figure 1A:
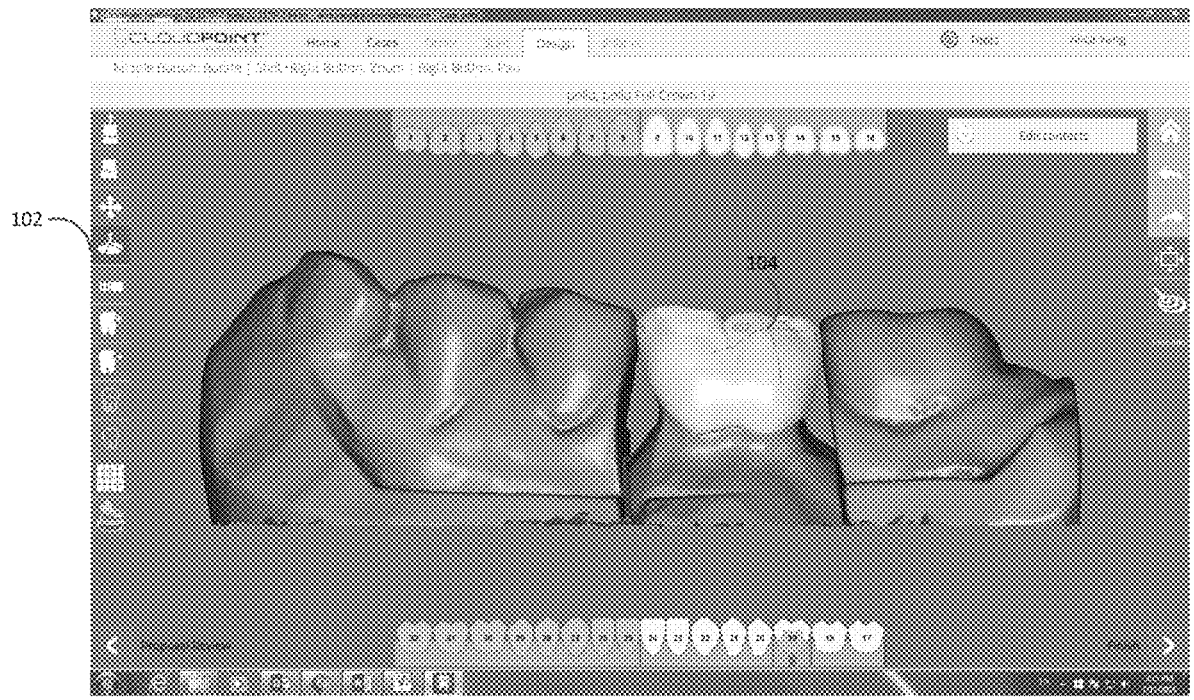
FIGS. 1A-1B are graphic representations showing a "free form" tool for deformation of the restoration model design according to one embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Exemplary embodiments of methods and tools in systems for designing dental restorations are described herein. The computer-implemented methods of designing dental restorations described herein use an electronic image of at least a portion of a patient's dentition as a starting point for the design process. In some embodiments, the electronic image is obtained by a direct intraoral scan of the patient's teeth. This will typically take place, for example, in a dental office or clinic and be performed by a dentist or dental technician. In other embodiments, the electronic image is obtained indirectly by scanning an impression of the patient's teeth, by scanning a physical model of the patient's teeth, or by other methods known to those skilled in the art. This will typically take place, for example, in a dental laboratory and be performed by a laboratory technician. Accordingly, the methods described herein are suitable and applicable for use in chair side, dental laboratory, or other environments. Using the electronic image, a computer-implemented dental restoration design system including one or more design tools is used to design a suitable dental restoration and to provide instructions to a restoration fabrication machine, e.g., a mill. The fabrication machine is then used to produce the dental restoration, which may then be installed into the patient's mouth by a dentist.

In one embodiment, a plurality of scans (e.g., 3-5 scans per quadrant) is performed in order to obtain a suitable image of the patient's anatomy. For example, an occlusal, lingual, and buccal scan may be taken of both the preparation and the opposing jaws. Then, a single scan with the jaws in occlusion may be taken from the buccal perspective to establish the proper occlusion relationship between the preparation jaw and the opposing jaw. Additionally, in some embodiments, interproximal scans are added to capture the contact areas of neighboring teeth. Once the scanning process is completed, a scanning system (not shown in FIGS) will assemble the plurality of scans into a 3D digital dental model of the preparation tooth and its surrounding and opposing teeth. The 3D dental model can be used to design a restoration to be used on the preparation tooth. For example, a dental restoration design program may process and display the 3D digital model in a user interface on a user device. A user (e.g., a design technician) operating on the user device can view the dental model and design or refine a dental restoration model by comparing to its surrounding and opposing teeth model.

In one embodiment, the dental restoration design program may provide a restoration model proposal to the user based on the dental model before the user starts doing manual design. For example, the dental restoration design program can search a tooth library for the library tooth that best matches the neighboring dentition of the preparation tooth in the dental model and position it naturally, taking into consideration the natural structure of the arch form within which the library tooth is located. In such a process, the dental restoration design program may perform an initial placement of the arch form of library tooth based on the position of the preparation tooth, the buccal direction and the occlusal direction. The dental restoration design program may also fit the arch form of the library tooth to the dental model based on certain criteria. In addition, the dental restoration design program may improve the position of each individual tooth in the arch form to be aligned to the dental model. In one embodiment, a user can also place an arch form of the library teeth and fit it to the dental model of the preparation tooth.

In one embodiment, the user may be shown by the dental restoration design program a proposal of the arch form placement and adjust the placement of the arch form manually.

During the restoration design process, multiple design tools are provided by the system or program for the user to design the restoration model.

Grove Tool

Figure 1B:
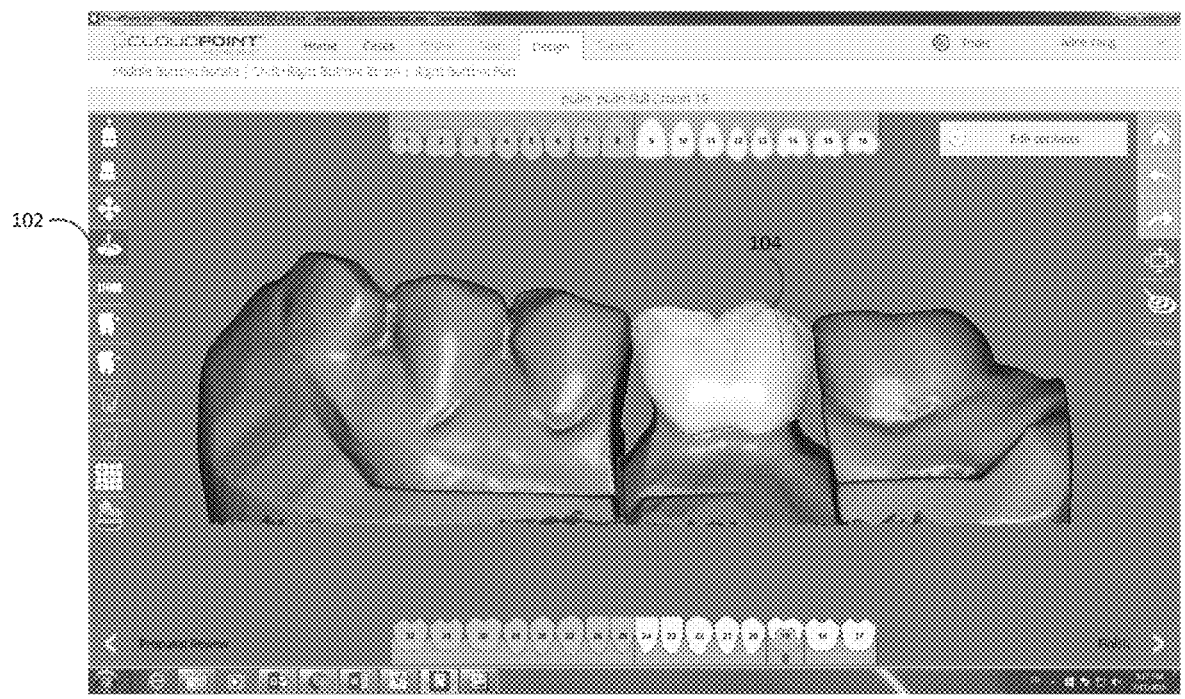

In one embodiment, the system includes a "free form" tool that provides a cross defining an area on the surface of a restoration (e.g., a crown) model and intersection point of the cross can be dragged by the user to deform that area of the restoration. Referring to FIGS. 1A-1B, graphical user interfaces showing the "free form" tool are illustrated according to one embodiment. For example, as shown in FIG. 1A, by clicking the "free form" tool button 102, the cross 104 is displayed on the surface of the restoration model and the cross 104 defines an area on the surface. A user is allowed to click on the intersection point of the cross 104 and move the mouse to pull out or bring in that area of the restoration covered or defined by the cross 104. In the illustrated embodiment of FIG. 1B, when the intersection point is clicked on and the cross 104 is moved outward from the surface of the restoration, the area defined by the cross 104 is deformed, e.g., expands along the mouse moving direction. Further, the "free form" tool allows a user to bring in an area of the restoration model. For example, a user is enabled to bring inward the cross 104 from the surface of the restoration model and the area covered by the cross 104 is deformed accordingly, e.g., dented, along the mouse moving direction.

Figure 2:
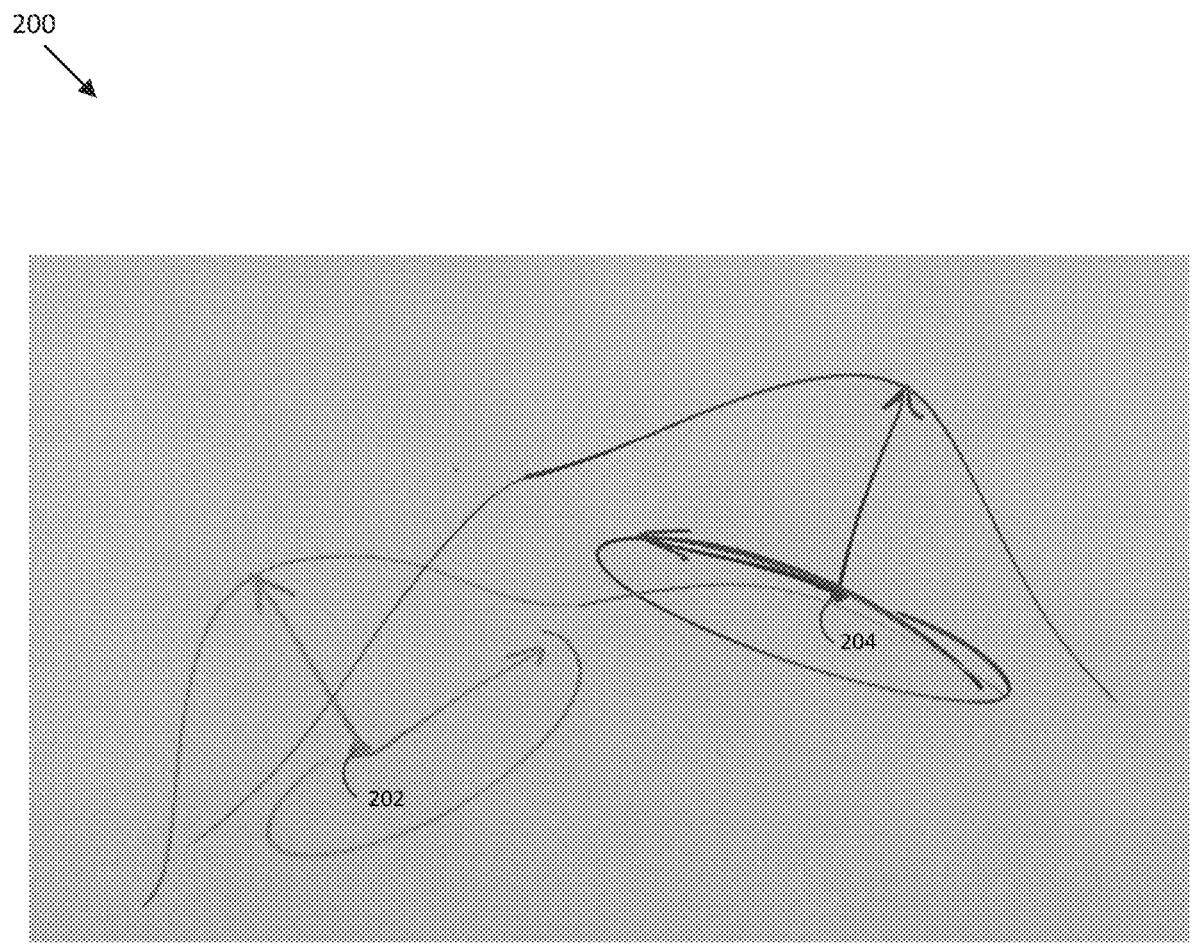
FIG. 2 is a diagram showing deformations created by using the "free form" tool according to one embodiment.

Referring to FIG. 2, a diagram 200 showing deformations created by using the "free form" tool is illustrated. With the "free form" tool, from a single point 202 or 204, a displacement can be created by moving the point 202, 204. For example, surrounding area of the point creates a deformation of the surface of the restoration model, as shown in FIG. 2.

Figure 3:
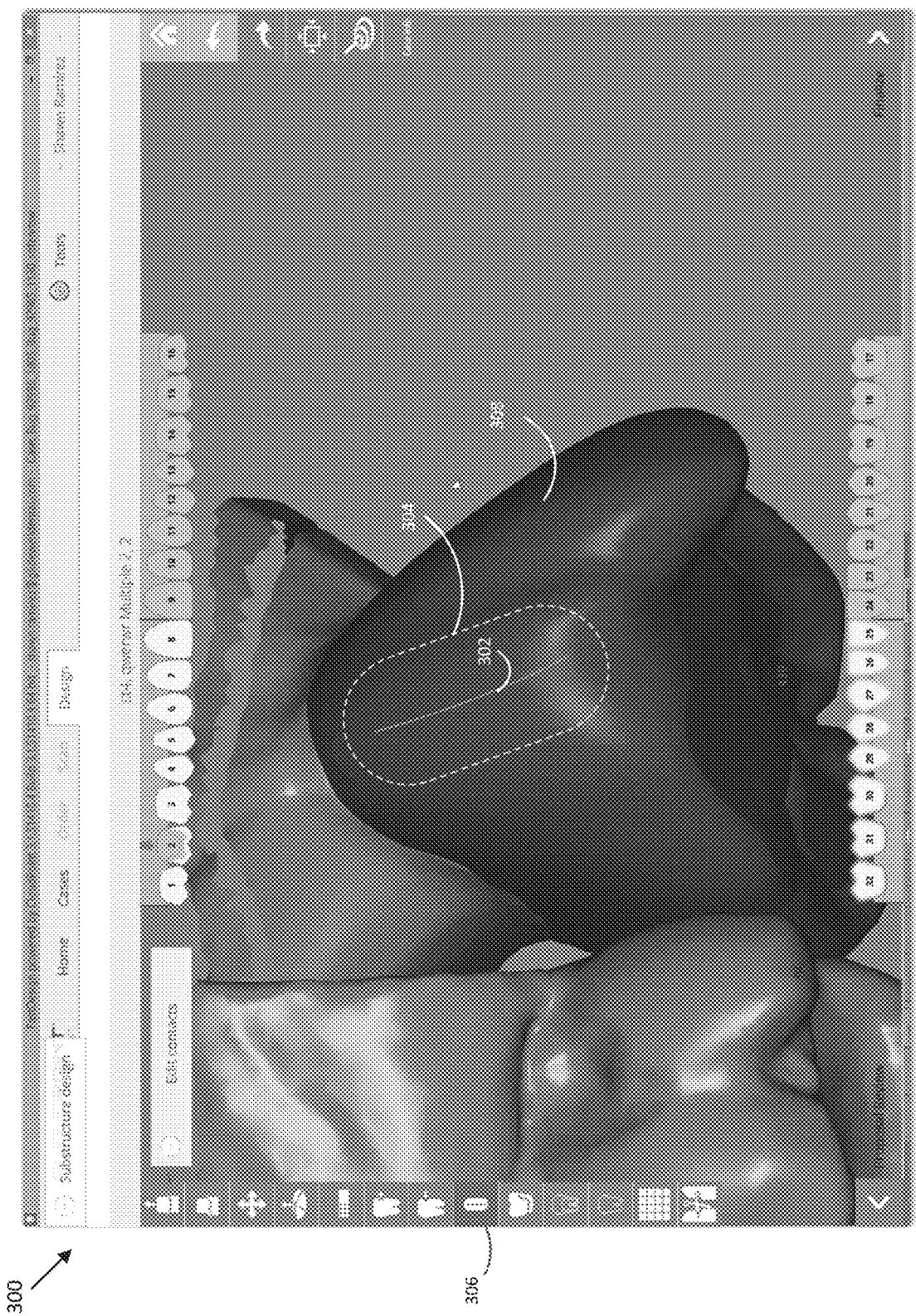
FIG. 3 is a graphic user interface showing a line and its surrounding area generated by using the "grove" tool according to one embodiment.

In one embodiment, a "grove" tool is also used to refine the shape of the restoration model. The difference from the "free form" tool is that the "grove" tool enables a line to be drawn on the surface of the restoration model. For example, the "grove" tool enables a user to click and define a line on the surface of the restoration model, where the surrounding area of the line can be a cylinder and the surrounding area covers a portion of the restoration model. A deformation of the restoration model can then be created at the portion covered by the area surrounding the line. Referring to FIG. 3, illustrated is a graphic user interface 300 showing a line 302 and its surrounding area 304 generated by using the "grove" tool 306 according to one embodiment. As shown in FIG. 3, the button 306 is turned on by a user, indicating that the "grove" tool is chosen by the user to design the restoration model 308. With the "grove" tool, the user is allowed to draw a line 302 on the surface of the restoration model 308 and a surrounding area 304 of the line 302 shown up immediately with the line 302 being drawn on the restoration model 308. In the illustrated embodiment, the surrounding area 304 has a shape of a running track. In other embodiments, the surrounding area 304 may be of any other appropriate shapes. In addition, the graphic user interface 300 may use other types of indicators than a dashed line to show the surrounding area 304 of the line 302. For example, the graphic user interface 300 may show the surrounding area 304 in a different color or grey level than other portion of the restoration model's surface.

Figure 4:
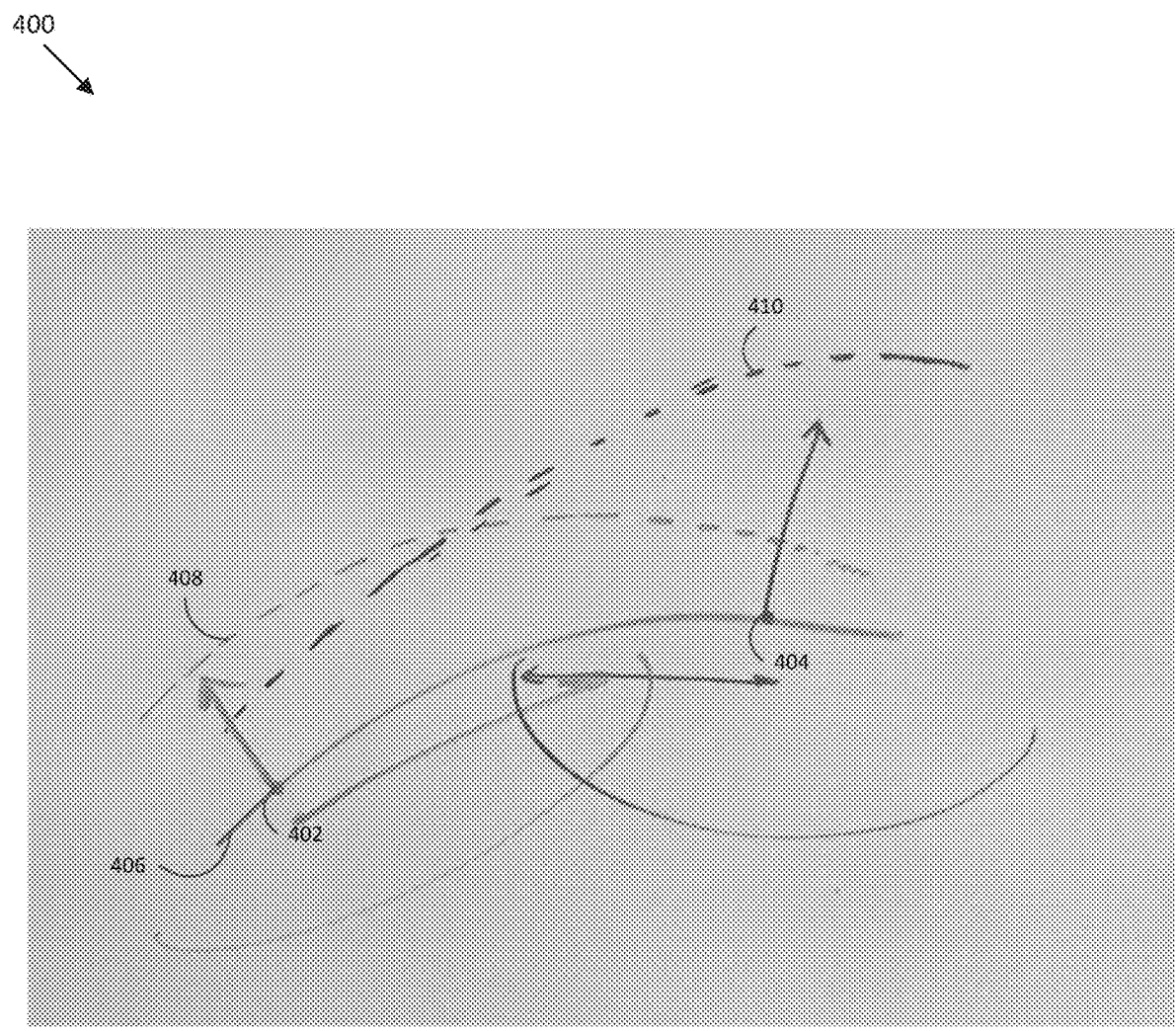
FIG. 4 is a diagram showing deformations created by using a "grove" tool according to one embodiment.

In one embodiment, the "grove" tool further enables the user to grab a point on the line and move the line by using a mouse so the deformation can be created, where the tendency of where the user creates the deformation is relevant to the placement of the mouse. For example, when the user clicks and drags a point on the bottom portion of the line, most of the movement of the mouse creates deformation associated with the bottom portion; when the user clicks and drags a point on the top portion of the line, most of the movement of the mouse causes deformation associated with the top portion. If the user clicks and drags a point in the middle portion of the line, the movement of the mouse creates deformation occurring equally in amount at the whole portion covered by the surrounding area of the line. Referring to FIG. 4, a diagram 400 showing deformations created by using a "grove" tool is illustrated according to one embodiment. Elements 402, 404 represent a point at one end portion of the line 406 respectively. The solid line 406 represents a line drawn on the surface of a restoration model. Dashed line 408 represents the deformation of restoration model if a user clicks on the point 402 and pulls up the line 406. Dashed line 410 represents the deformation of the restoration model if the user clicks on the point 404 and pulls up the line 406. It can be shown that when a user selects a point at one end portion of the line and drags the point to move the line, most of the movement creates deformation associated with this end portion, as described above.

Figure 5:
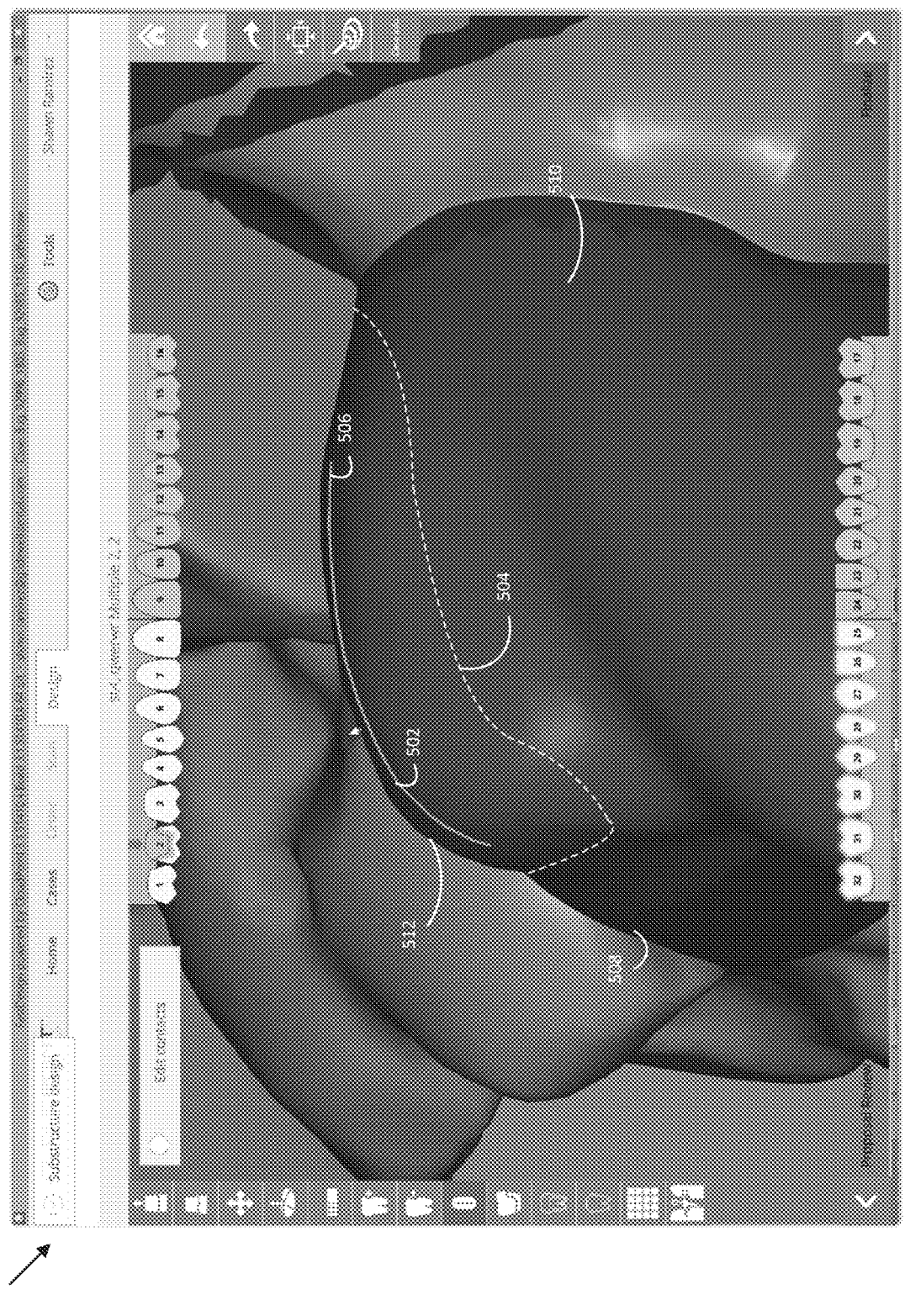
FIG. 5 is a graphic user interface showing restoration model deformation created by pulling out a point at one end portion of the line according to one embodiment.

Referring to FIG. 5, a graphic user interface 500 showing restoration model deformation created by pulling out a point at one end portion of the line is illustrated according to one embodiment. Point 502 is at one end portion of the line 506. For example, the point 502 is at the portion closer to the occlusal table 508 of the dental restoration model 510. Dashed line 504 indicates the surrounding area of the line 506. The illustrated embodiment of FIG. 5 shows a case where the user selects the point 502 and drags the point 502 to move the line 506. Accordingly, the shape change of the restoration model 510 occurs mostly in amount at the portion that surrounds where the point 502 is located. Therefore, the restoration model 510 has a deformation as denoted as 512. The deformation 512 occurs mostly in amount at the portion surrounding the end portion of the line 506 where the point 502 is located. For example, the portion surrounding the end portion where the point 502 is located expands to where the mouse goes; however, the other portion covered by the surrounding area 504 expands less. The difference of expansion or deformation degrees between different portions of the surrounding area 504 can be pre-defined according to certain criteria, e.g., geometric rules, physics rules, or dental restoration design rules, etc.

Figure 6:
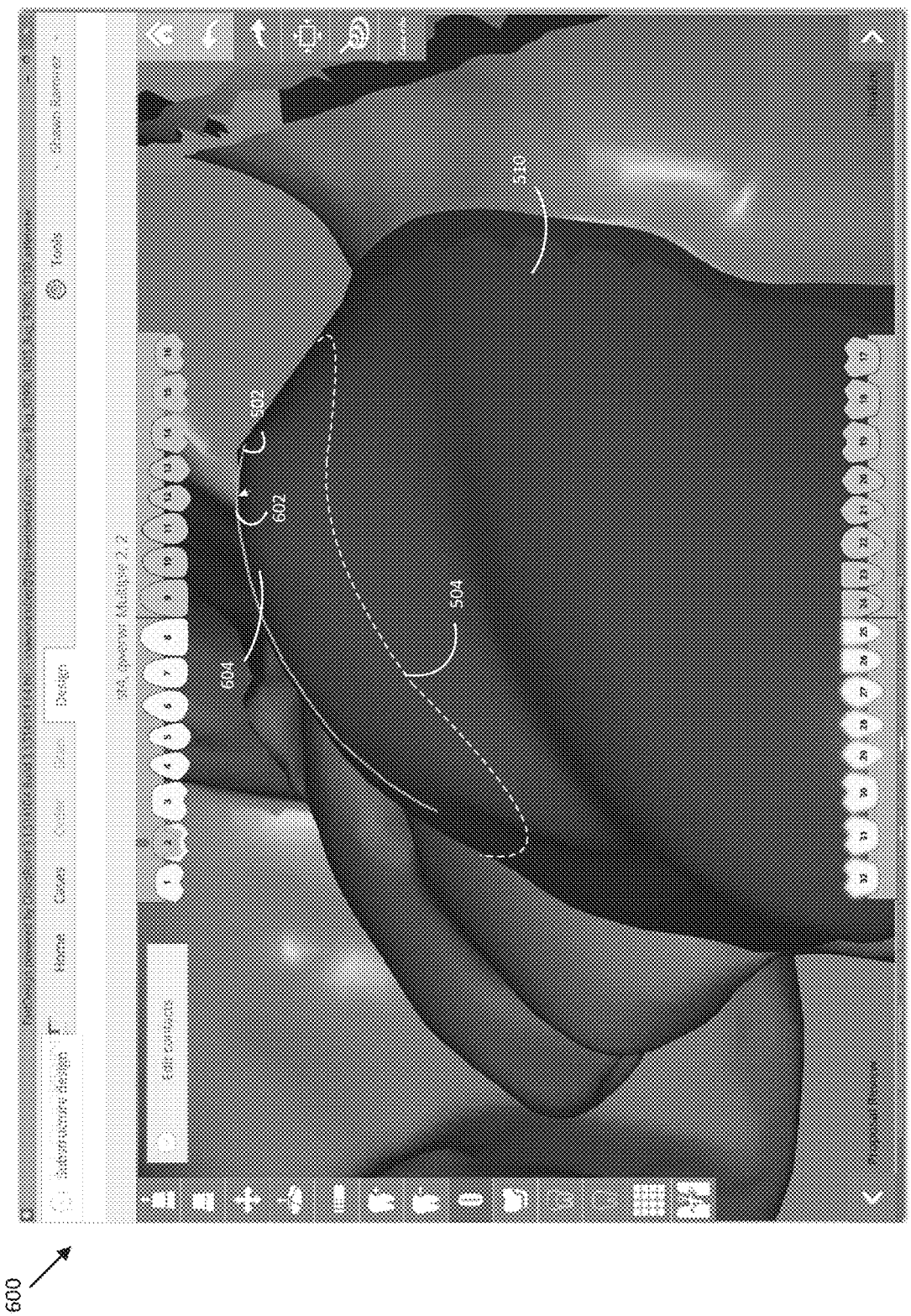
FIG. 6 is a graphic user interface showing restoration model deformation created by pulling out a point at another end portion of the line according to one embodiment.

As comparison, referring to FIG. 6, illustrated is a graphic user interface 600 showing restoration model deformation created by pulling out a point at another end portion of the line according to one embodiment. In the illustrated embodiment, a point 602 at the other end portion of the line 502 is dragged by the user to pull the line 502 outward. The point 602 is at the portion closer to the bottom of the restoration model 510. Compared with the deformation 512 at the portion near the occlusal table 508 as shown in FIG. 5, the deformation 604 of the restoration model 510 occurs mostly in amount at the bottom portion of the line 502 where the point 602 is located. Similarly, the difference of expansion or deformation degrees between different portions of the surrounding area 504 can be predefined according to certain criteria, e.g., geometric rules, physics rules, or dental restoration design rules, etc.

Figure 7:
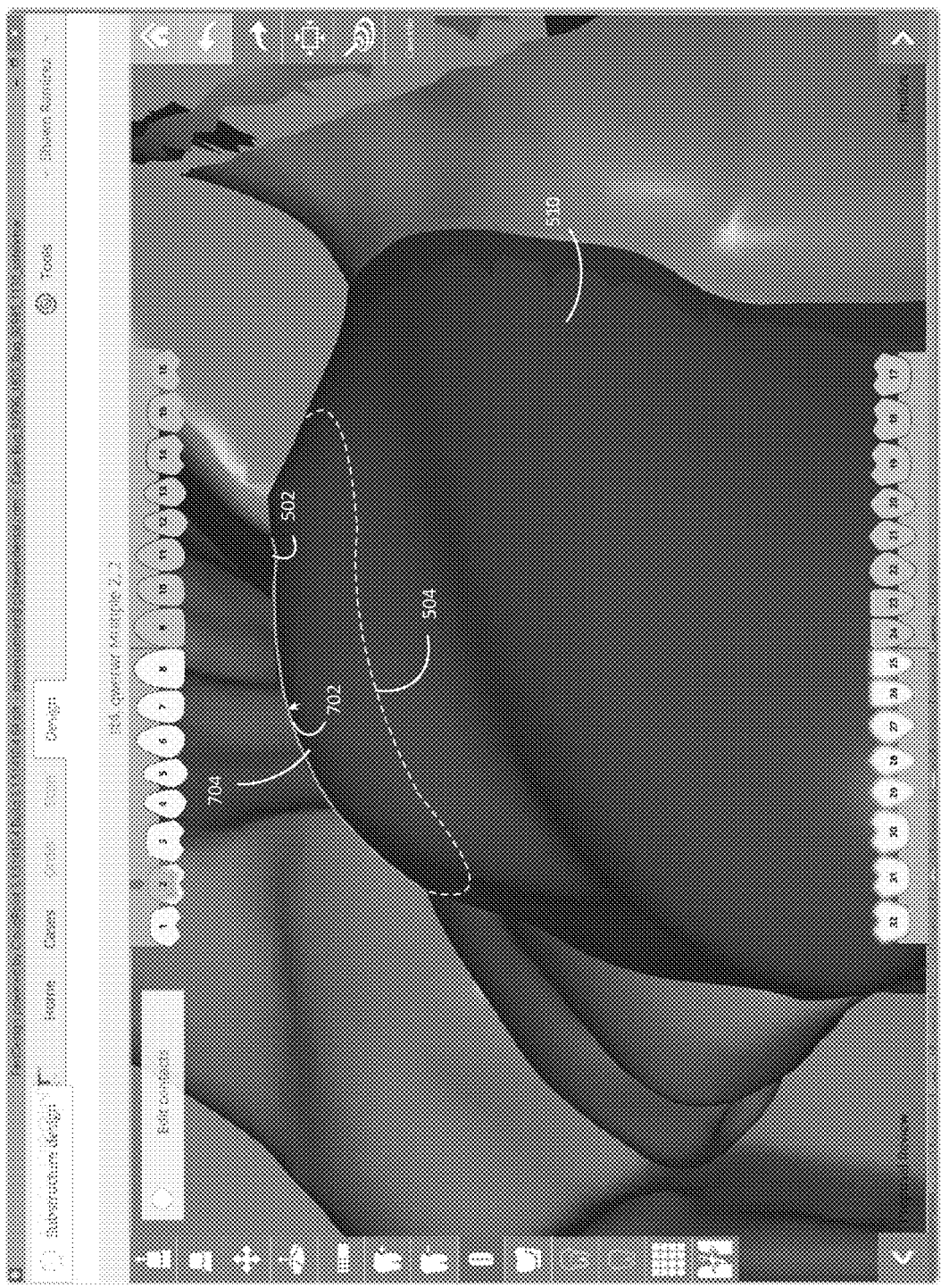
FIG. 7 is a graphic user interface showing restoration model deformation created by pulling out a point in the middle portion of the line according to one embodiment.

Referring now to FIG. 7, a graphic user interface 700 showing restoration model deformation created by pulling out a point in the middle portion of the line is illustrated according to one embodiment. In this embodiment, a point 702 in the middle portion of the line 506 is dragged by the user to move the line 502 straight up. The shape change of the restoration model 510 involves almost the whole portion covered by the surrounding area 504 of the line 502. Therefore, the restoration model 510 has a deformation 704 almost equally in amount among the portion covered by the area 504. This function is particularly valuable when a user desires to maintain the surface's shape along the line while changing the size or other measurements of the restoration model, because this function allows the user only to cause the area defined by the line to move straightly outward or inward. As described above, when a user clicks and moves the middle point of the line, the whole surrounding surface area defined by the line may be deformed, e.g., pulled out or brought in, without changing the local shape within the surrounding surface area.

Figure 8A:
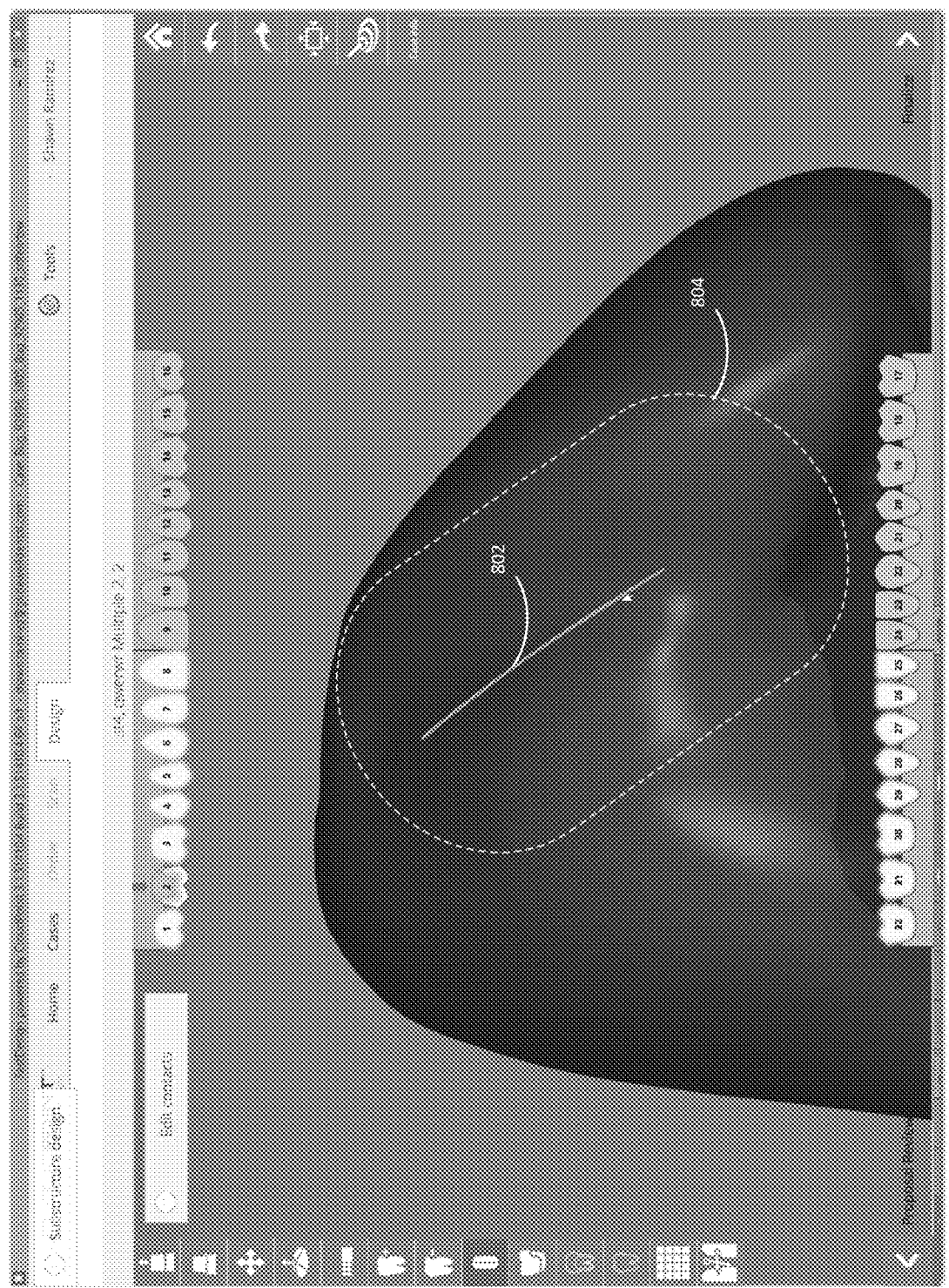
FIGS. 8A-8B are graphic user interfaces showing restoration model deformation created by bringing in a point on the line according to one embodiment.
Figure 8B:
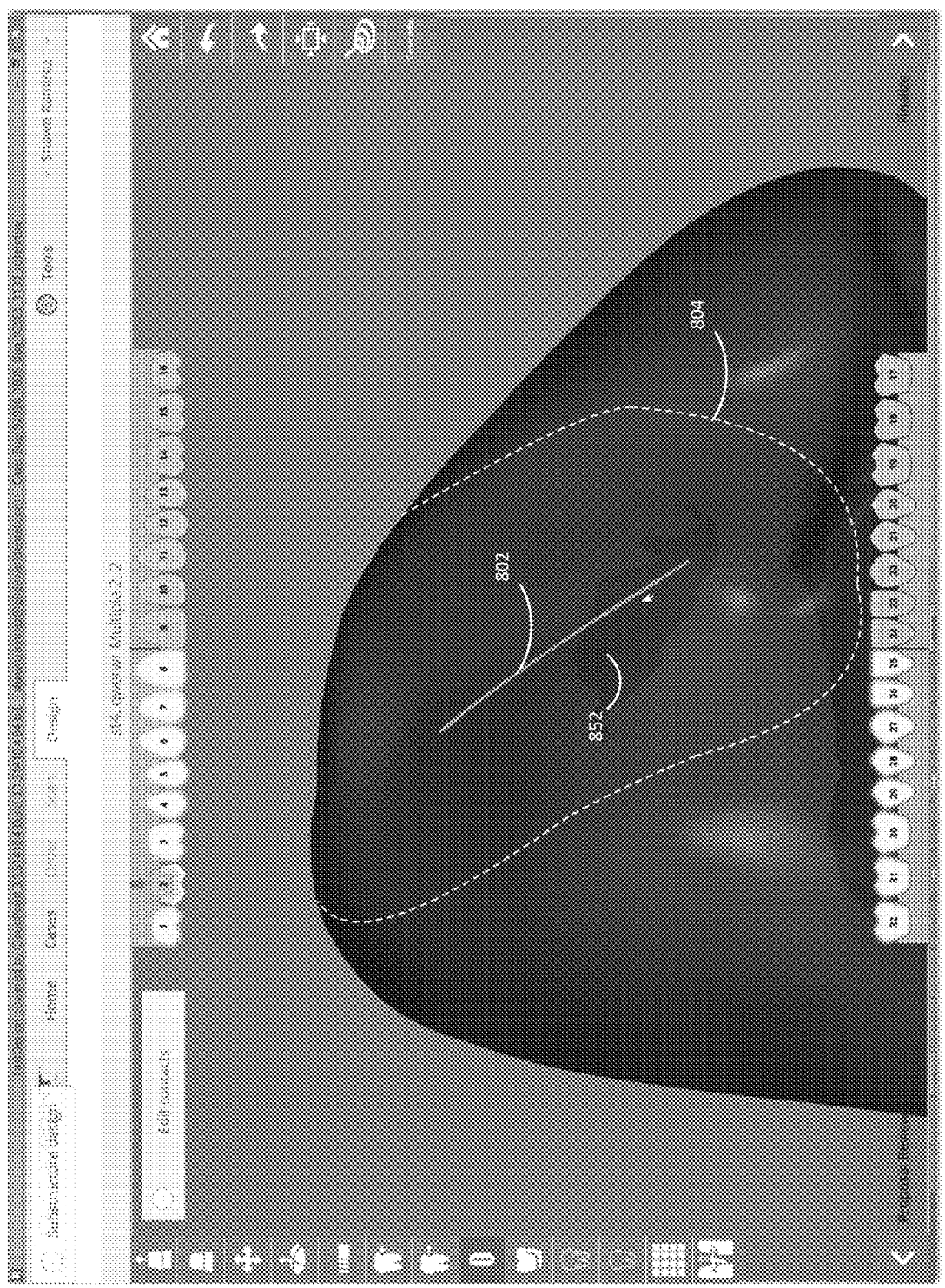

In one embodiment, the movement or deformation occurs either in or out the surface, in the direction of the surface normal. In addition, the deformation can occur in lateral of the surface normal, either left or right of the surface. For example, the line can be clicked and moved reversely, e.g., instead of pulling out, it can be brought in, so that the anatomy is improved. Referring to FIGS. 8A-8B, illustrated are graphic user interfaces 800, 850 showing restoration model deformation created by bringing in a point on the line according to one embodiment. The graphic user interface 800 in FIG. 8A shows that a line 802 has been drawn on the side contour of the restoration model. A surrounding area 804 of the line 802 has also been indicated. The graphic user interface 850 in FIG. 8B depicts that the line 802 is brought inward of the restoration's surface along the direction of the surface normal. Therefore a deformation 852 is formed at the portion defined by the surrounding area 804 on the side contour. For example, the portion covered by the surrounding area 804 of the line 802 is depressed or dented in the amount proportional to the movement of the line 802 (or the mouse).

Figure 9A:
FIGS. 9A-9B are graphic user interfaces showing occlusal table adjustment using the "grove" tool according to one embodiment.
Figure 9B:
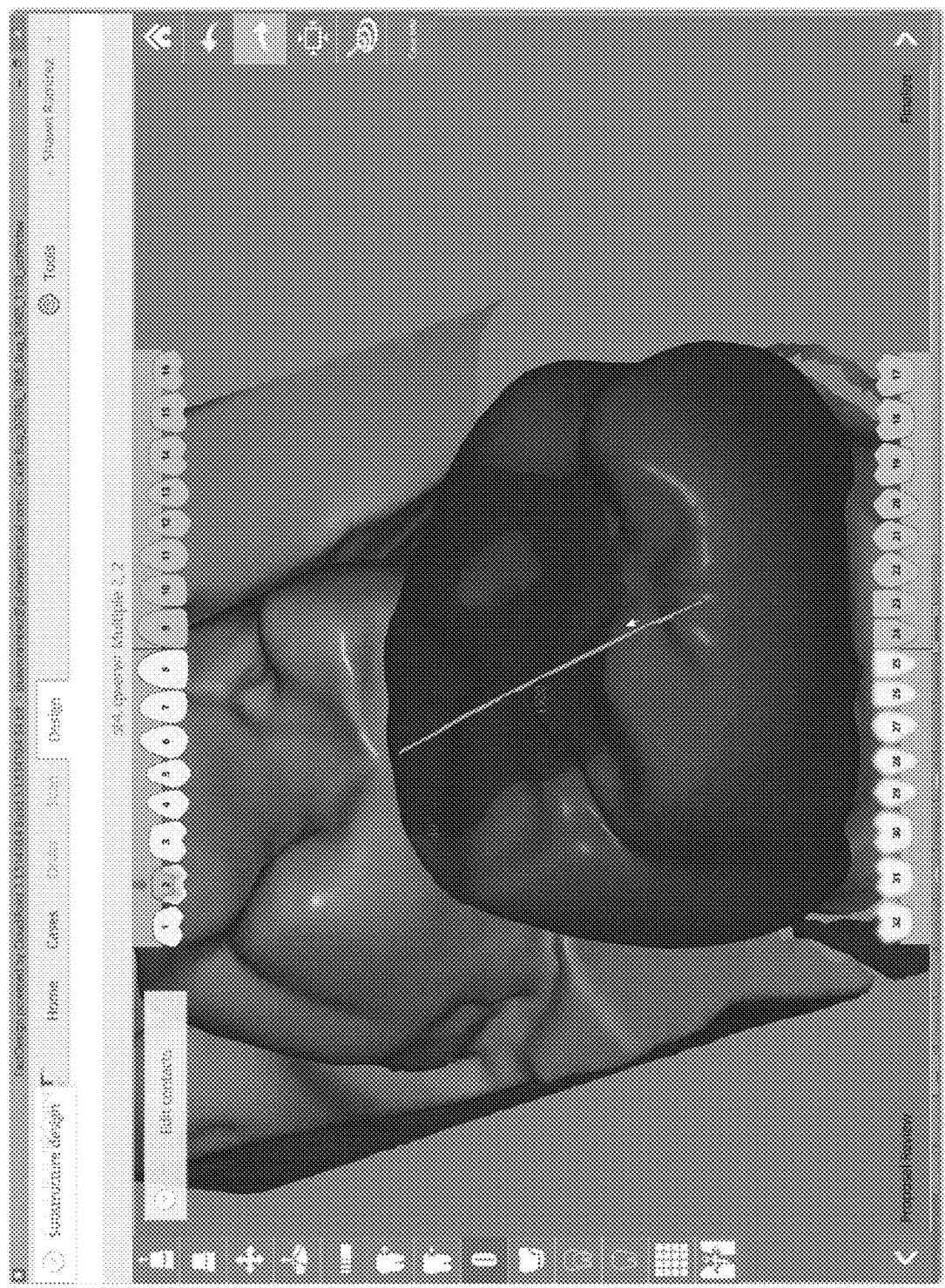

This kind of feature is also useful in certain dental design situations, e.g., providing ability to define what is referred to as "line angles", which are facial anatomy of the posterior restorations, and which can be hi-definition contour that travels from the gingival to the occlusal line. It can also be used to accentuate the oblique transverse ridges which travel from occlusal cusps toward developmental groove in the occlusal table, where the tool can be used to increase and decrease the ridges for the opposing dentition. Referring to FIGS. 9A-9B, illustrated are graphic user interfaces 900, 950 showing occlusal table adjustment using the "grove" tool according to one embodiment. It can be shown the "grove" tool has been used in adjusting the occlusal table of the restoration model.

Figure 10:
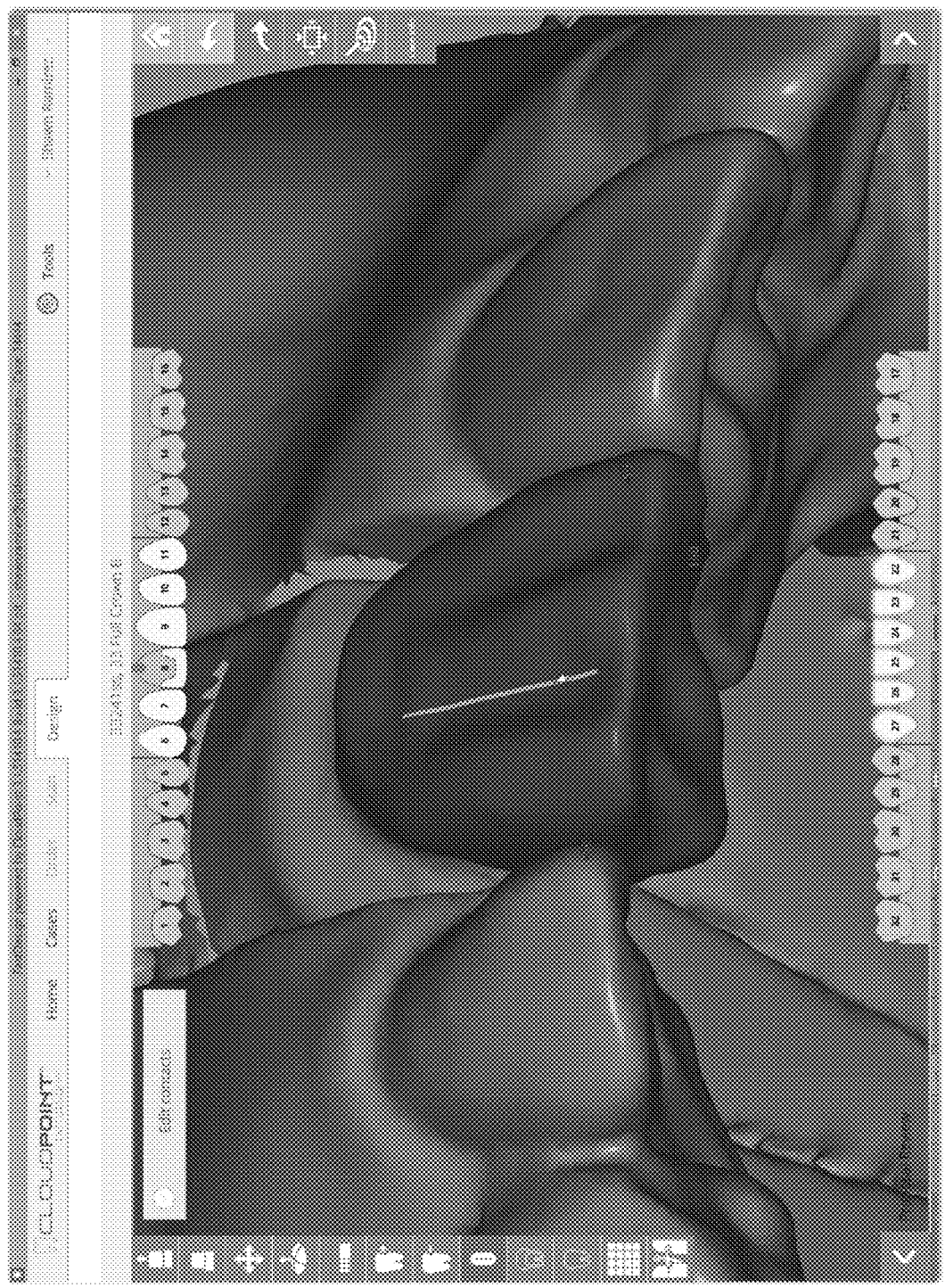
FIG. 10 is a graphic user interface showing anterior model adjustment using the "grove" tool according to one embodiment.
Figure 11:
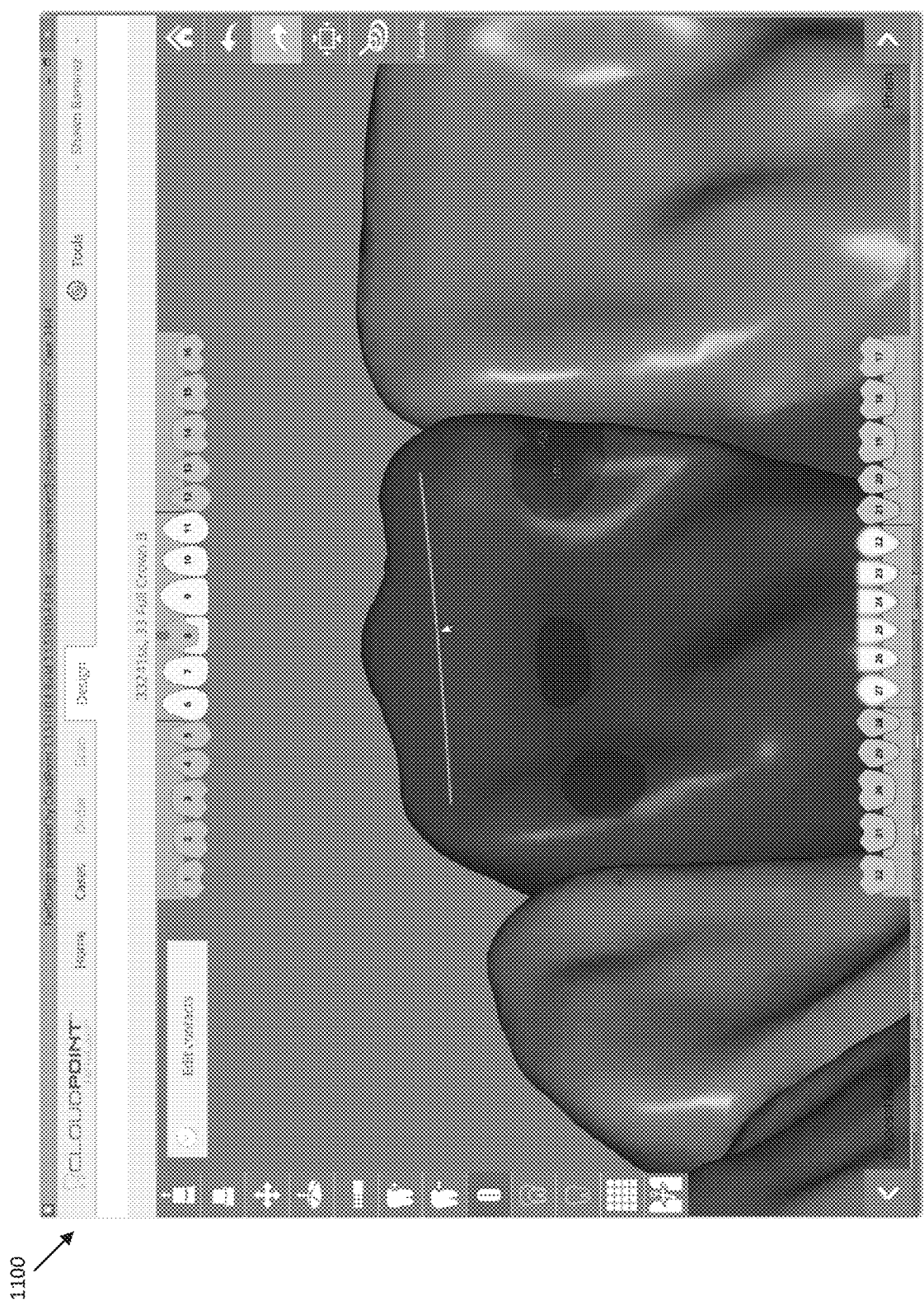
FIG. 11 is a graphic user interface showing anterior model adjustment using the "grove" tool according to another embodiment.

The "grove" tool is also a useful feature for modifying facial anatomy for both posterior and anterior restorations. It can also be used when the user draws a line along inside edge of the crown and adjust the shape of the localized edge. Referring to FIGS. 10 and 11, illustrated are graphic user interfaces 1000, 1100 showing anterior model adjustment using the "grove" tool according to two embodiments. In one embodiment, a localized curvature along the line may be created. For example, the "grove" tool may allow a user to define or draw a curved line so the line can follow the movement of the mouse.

Real Time Display of Point-to-Point Distance

In one embodiment, a point-to-point distance can be measured and displayed associated with the restoration model in real time during the design process. Further, the measurement can be updated in real time while the mouse is moving and is displayed on the user interface in real time. The benefit is that by updating and displaying the measurement in real time, the system provides useful and simultaneous measurement information to the user while the user is moving the mouse to refine the restoration model.

Figure 12:
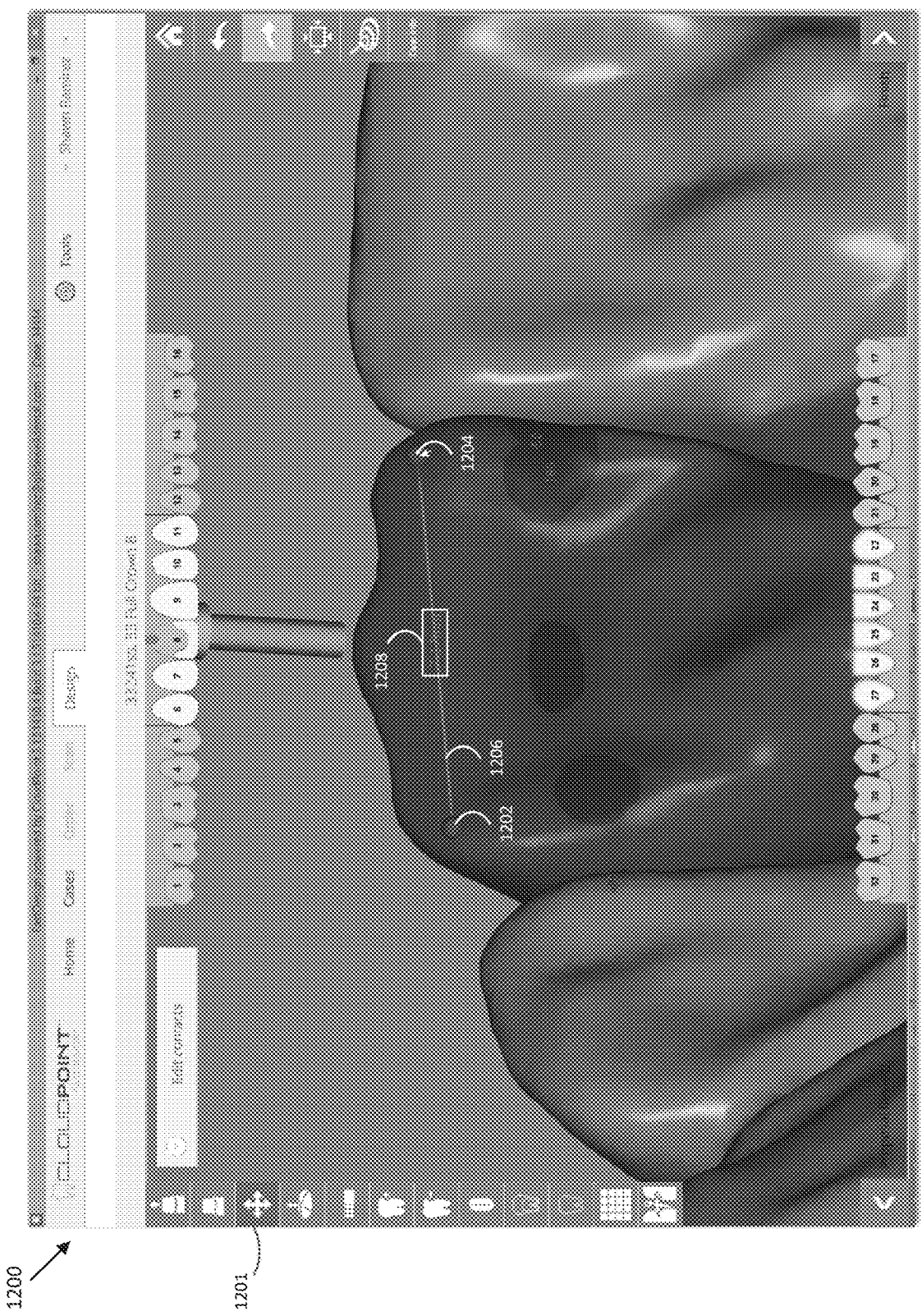
FIG. 12 is a graphic user interface showing real-time measurement display according to one embodiment.

Referring to FIG. 12, illustrated is a graphic user interface 1200 showing real-time measurement display according to one embodiment. Element 1201 is a graphic representation of a tool button that can be selected by a user to draw lines on the restoration model. Elements 1202, 1204 are graphic representations of points on the restoration model defined by the user using the tool 1201. For example, the user clicks on the restoration model and the point 1202 is created and displayed. When the user clicks on the restoration model at a different location, the second point 1204 is created and a line 1206 is also defined. Simultaneously, a value 1208 indicating the length of the line 1206 (or the distance between the two points 1202, 1204) is calculated and displayed on the line 1206. In the illustrated embodiment, the length or distance value 1208 is displayed on the restoration model in real time. That is, the value 1208 shows up at the same time when the line 1206 is defined. Further, the length or distance value 1208 may also be updated and displayed in real time when the line 1206 is changed. For example, when the user adjusts the location of the second point 1204, the line 1206 is redrawn and updated, and the length or distance value 1208 is re-calculated and updated too. The updated length or distance value 1208 is displayed in real time.

Tools to Lock a Portion

Usually the user (e.g., a technician) works from larger scale to smaller scale (e.g., towards more and more localized area). For example, the user may first make an acceptable occlusion and then work on adjacent contact. However, when the user works on the adjacent contact, adjustment on the adjacent contact probably causes some distraction on the occlusal surface that has been already finished and accepted. Therefore, here comes a desire to protect the occlusal that has been already finished from distraction caused by adjustment on other portions.

In one embodiment, the system includes tools to lock one or more certain portions of the design. When the user works on the other portions, the locked portions are not affected and thus these portions of the design can be protected. For example, a tool "pin occlusal table" enables the user to pin the occlusal table so that the user can make changes of the side contour of the restoration without affecting the occlusal table. Inversely, another tool "pin side contour" enables the user to pin the side contour and work on the occlusal table. Therefore, these tools accommodate the different working orders of users.

In one embodiment, a three dimensional (3D) library restoration model defines the surface of the model using segmented geometric element, e.g., geometric triangles. An "occlusal table" represents the occlusal surface of a restoration model such as a crown model. The "occlusal table" includes multiple such triangles. "Side contour" of the restoration model may represent the portions other than the "occlusal table," which may also include multiple such triangles. Therefore, those triangles define the area of an "occlusal table" of the restoration model and the area of "side contour" of the restoration model respectively. When a "pin occlusal table" tool is used, e.g., when a user checks the "pin occlusal table" box, the triangles representing the "occlusal table" of the restoration model surface are fixed as current size, shape, and relative position, even when the user changes the side contour of the restoration model. Inversely, when a "pin side contour" tool is used, e.g., when a user checks the "pin side contour" box, the triangles representing the "side contour" of the restoration model surface are fixed as current size, shape, and relative position even when the occlusal table is changed by the user.

Figure 13A:
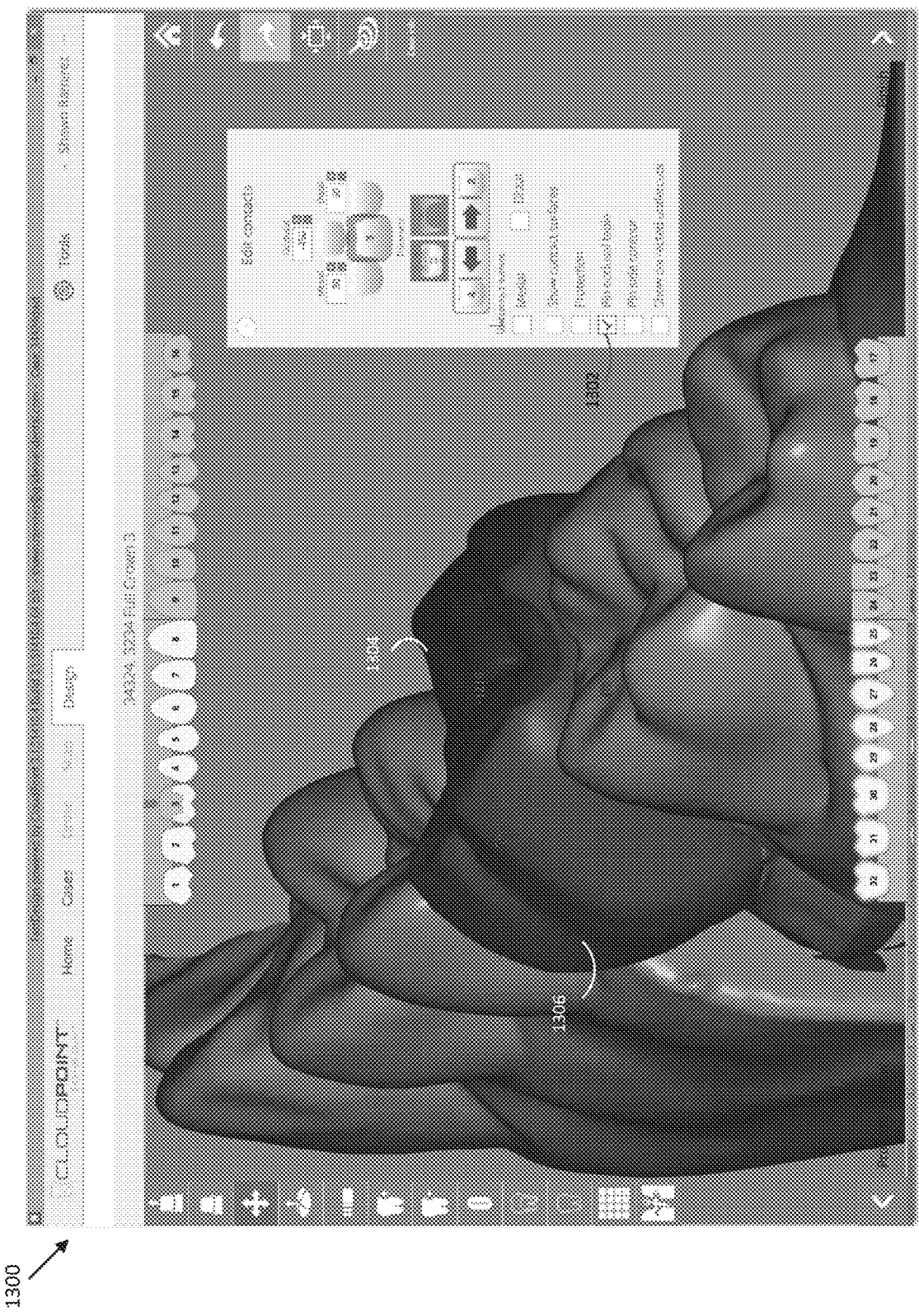
FIGS. 13A-13B are graphic user interfaces showing restoration model design using "pin occlusal table" tool according to one embodiment.
Figure 13B:
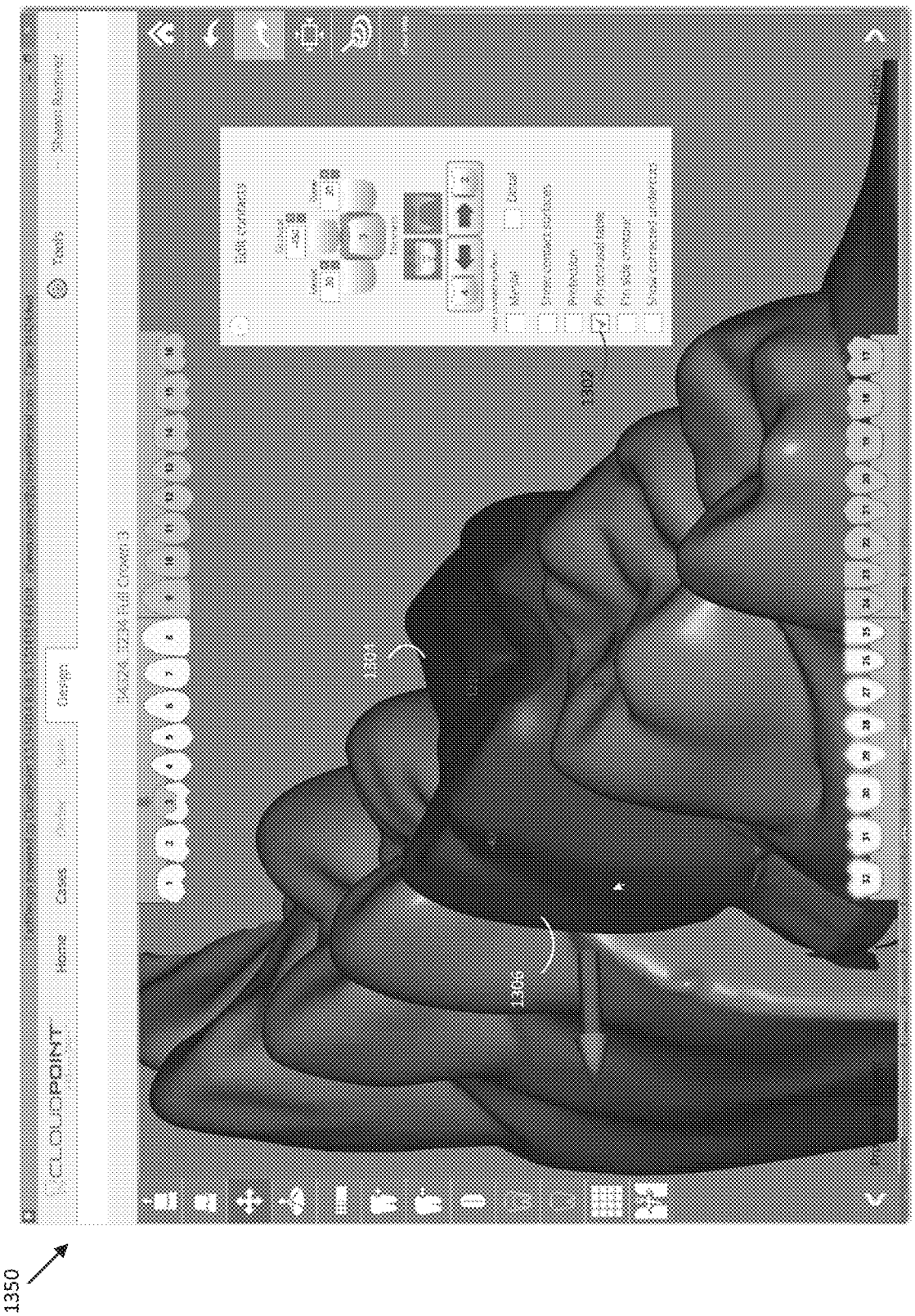

Referring to FIGS. 13A and 13B, illustrated are graphic user interfaces 1300, 1350 showing restoration model design using "pin occlusal table" tool according to one embodiment. In the illustrated embodiments in FIGS. 13A and 13B, a box of "pin occlusal table" 1302 is checked by the user. Therefore, the occlusal table 1304 of the restoration model is locked and protected from distraction. For example, when the user modifies the side contour 1306 of the restoration model, the occlusal table 1304 cannot be changed. If the box of "pin occlusal table" 1302 is not checked, the occlusal table 1304 may change along with the modification of the side contour 1306.

Figure 14:
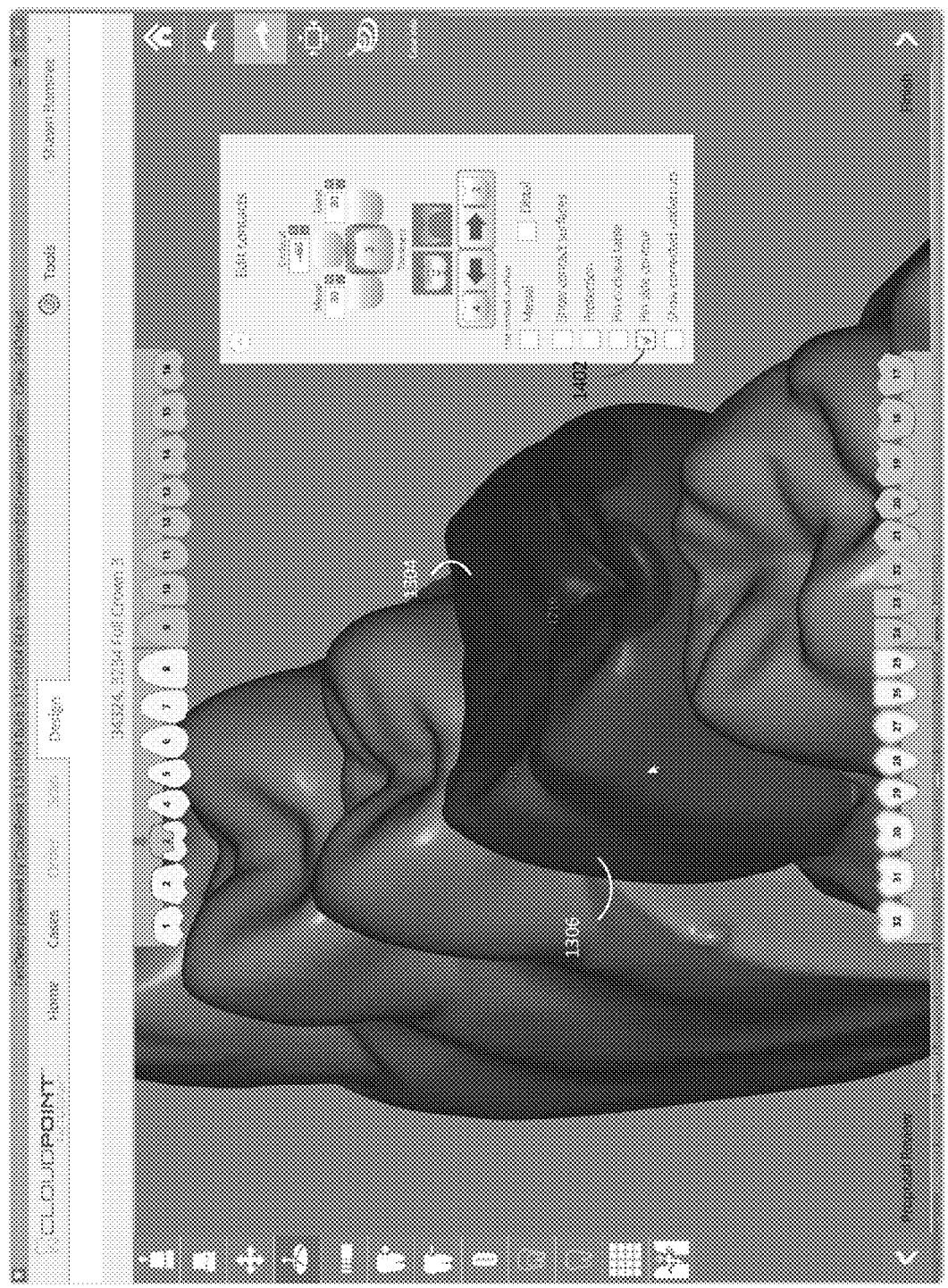
FIG. 14 is a graphic user interface showing a "pin side contour" tool according to one embodiment.

Referring now to FIG. 14, a graphic user interface 1400 showing a "pin side contour" tool is illustrated according to one embodiment. Element 1402 represents a box of "pin side contour" that can be checked by a user to lock the side contour portion of the restoration model. When the box of "pin side contour" 1402 is checked, the side contour 1306 is locked and protected from distraction. Therefore, when the user adjusts the occlusal table 1304, the side contour 1306 stays fixed and cannot be changed accordingly. If the box of "pin side contour" 1402 is not checked, then when the user changes the occlusal table design 1304, the side contour 1306 changes accordingly.

Cross Section Mode

In one embodiment, a "cross section mode" tool can allow the user to work on the restoration from the view of a two dimensional (2D) cross section plane. For example, the 2D cross section plane is perpendicular to the occlusal table plane. In the cross section mode, the thickness or other measurement of the design can be shown or displayed for the user to view and then the user can adjust the design accordingly. In one embodiment, any point in the cross section plane can be selected, and pulled up or down along the plane to adjust the thickness or other measurement of the design. For example, the user is enabled by the "cross section" tool to select a point on the cross section plane (e.g., a point on the periphery of the restoration on the plane, a point on the periphery of the preparation on the plane, etc.) and move the point up or down along the cross section plane to change the shape of the restoration or preparation. For example, when the point is moved toward the lingual or buccal portion along the plane of the 2D cross section, the restoration model can change accordingly.

Figure 15:
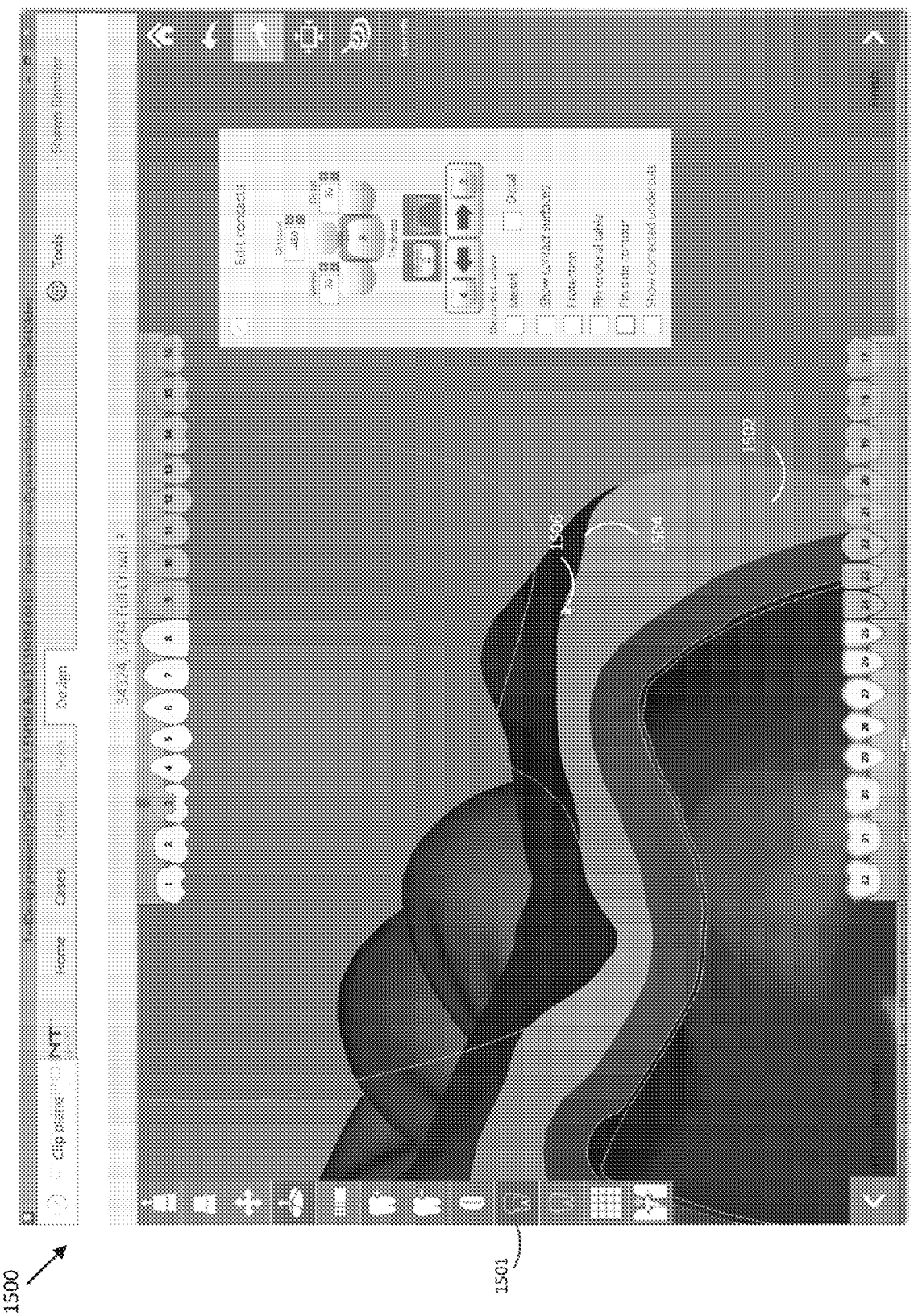
FIG. 15 is a graphic user interface showing restoration model design under a "cross section mode" according to one embodiment.

Referring to FIG. 15, illustrated is a graphic user interface 1500 showing restoration model design under a "cross section mode" according to one embodiment. In the illustrated embodiment, the tool button 1501 is clicked by a user to allow the user to work on the restoration model design under the "cross section mode." Element 1502 represents a 2D cross section plane of the restoration model. Element 1504 is the edge or periphery of the restoration on the 2D cross section plane. Any point on the edge 1504 can be selected by the user to pull up and down to adjust the shape of the restoration model along the plane 1502. For example, element 1506 represents a point on the edge or periphery 1504. By pulling down the point 1506, the edge or periphery 1504 is changed and thus the shape of the restoration model along the plane 1502 is changed as well. In one embodiment, when the shape of the restoration model in the cross section plane 1502 is changed, other portions of the restoration model (such as portions not in the cross section plane) may also change accordingly to accommodate the change in the cross section plane.

Aggressive to Smooth Bar

In one embodiment, the system includes an "aggressive to smooth" bar where a button can be dragged by the user along the bar to adjust the aggressiveness or smoothness of the curve of the restoration (such as a crown). For example, the bar enable a user to adjust the aggressiveness or smoothness of the lower portion of the crown's curve by changing the link or connection line between the preparation and the crown.

Figure 16A:
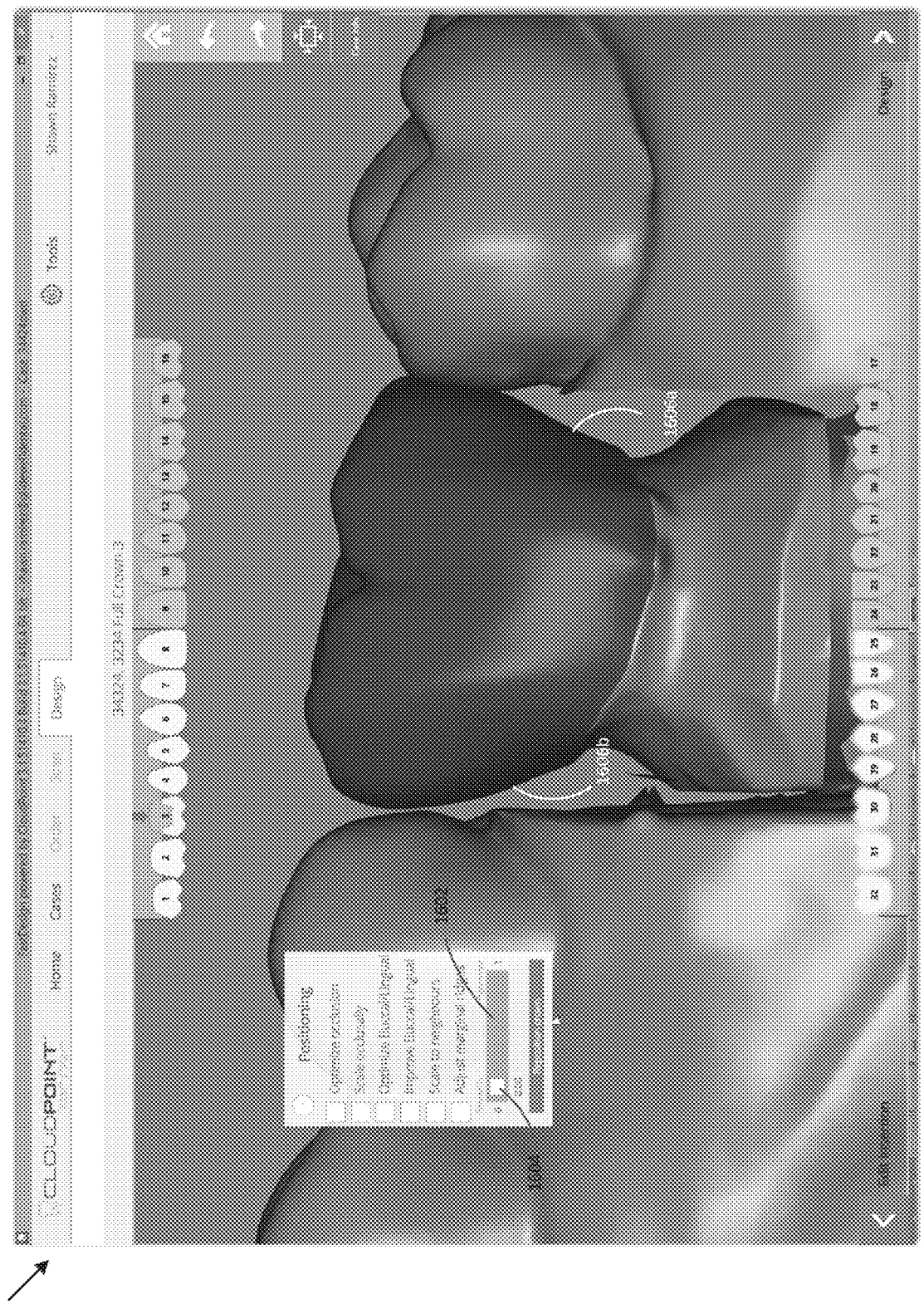
FIGS. 16A-16B are graphic user interfaces of restoration model design using an "aggressive to smooth" bar according to one embodiment.
Figure 16B:
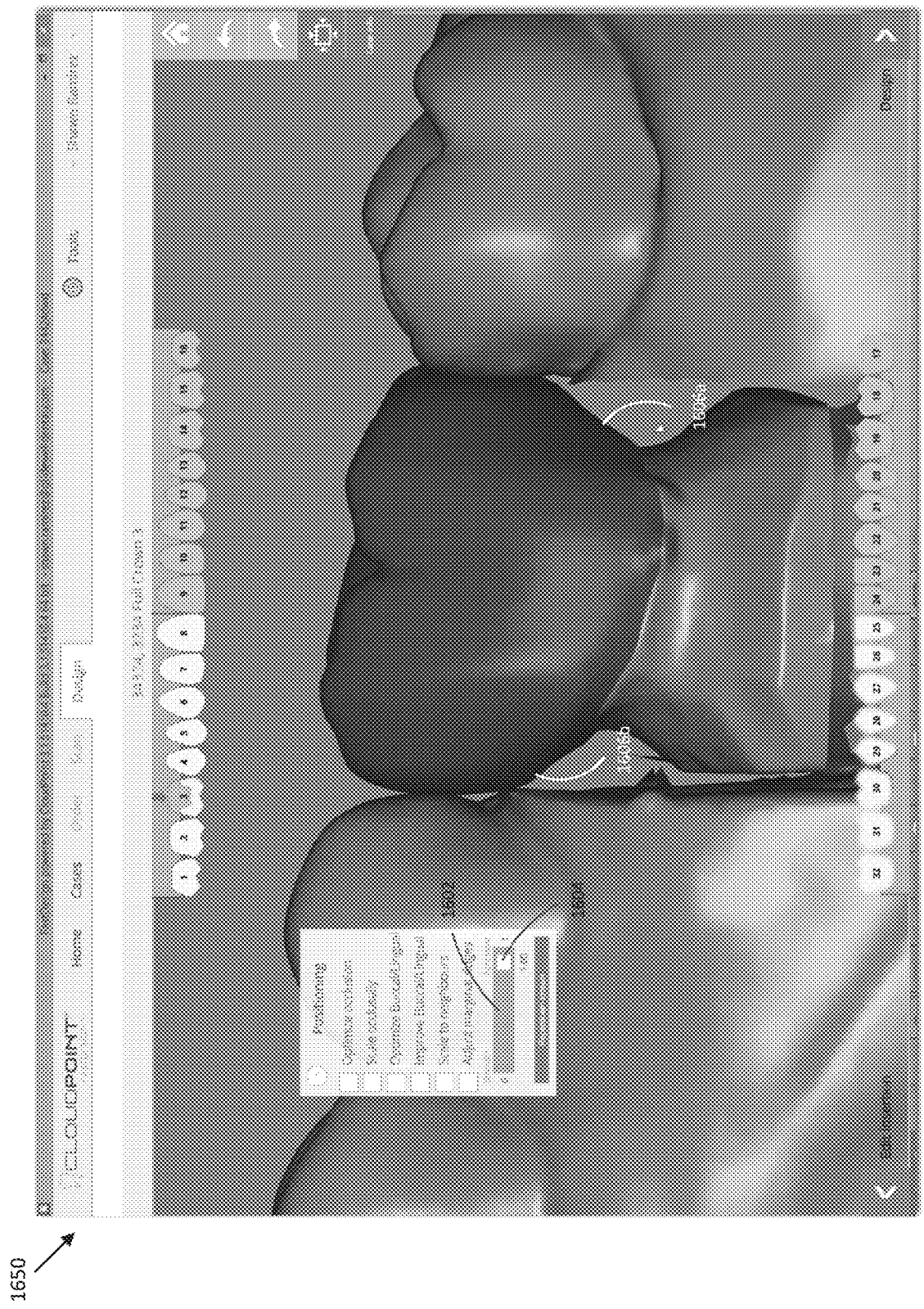

Referring to FIGS. 16A and 16B, illustrated are graphic user interfaces 1600, 1650 of restoration model design using an "aggressive to smooth" bar according to one embodiment. In both illustrated embodiments, element 1602 represents an "aggressive to smooth" bar where a button 1604 can be dragged by a user to adjust the aggressiveness or smoothness of the curve of the restoration model. Elements 1606a, 1606b represents the lower portions of the restoration model's surface curve. When the user puts the button 1604 at the left end of the bar 1602, the aggressiveness index of the curve is 0.00, which means the curve of the restoration model is the smoothest, as shown in FIG. 16A. Accordingly, the lower portions of the restoration model's surface curve 1606a, 1606b are the smoothest. In contrast, when the user drags the button 1604 to the right end of the bar 1602, as shown in FIG. 16B, the aggressiveness index of the curve is 1.00, where the curve of the restoration model is the most aggressive. Therefore, the lower portions of the restoration model's surface curve 1606a, 1606b in FIG. 16B are the most aggressive.

Figure 17:
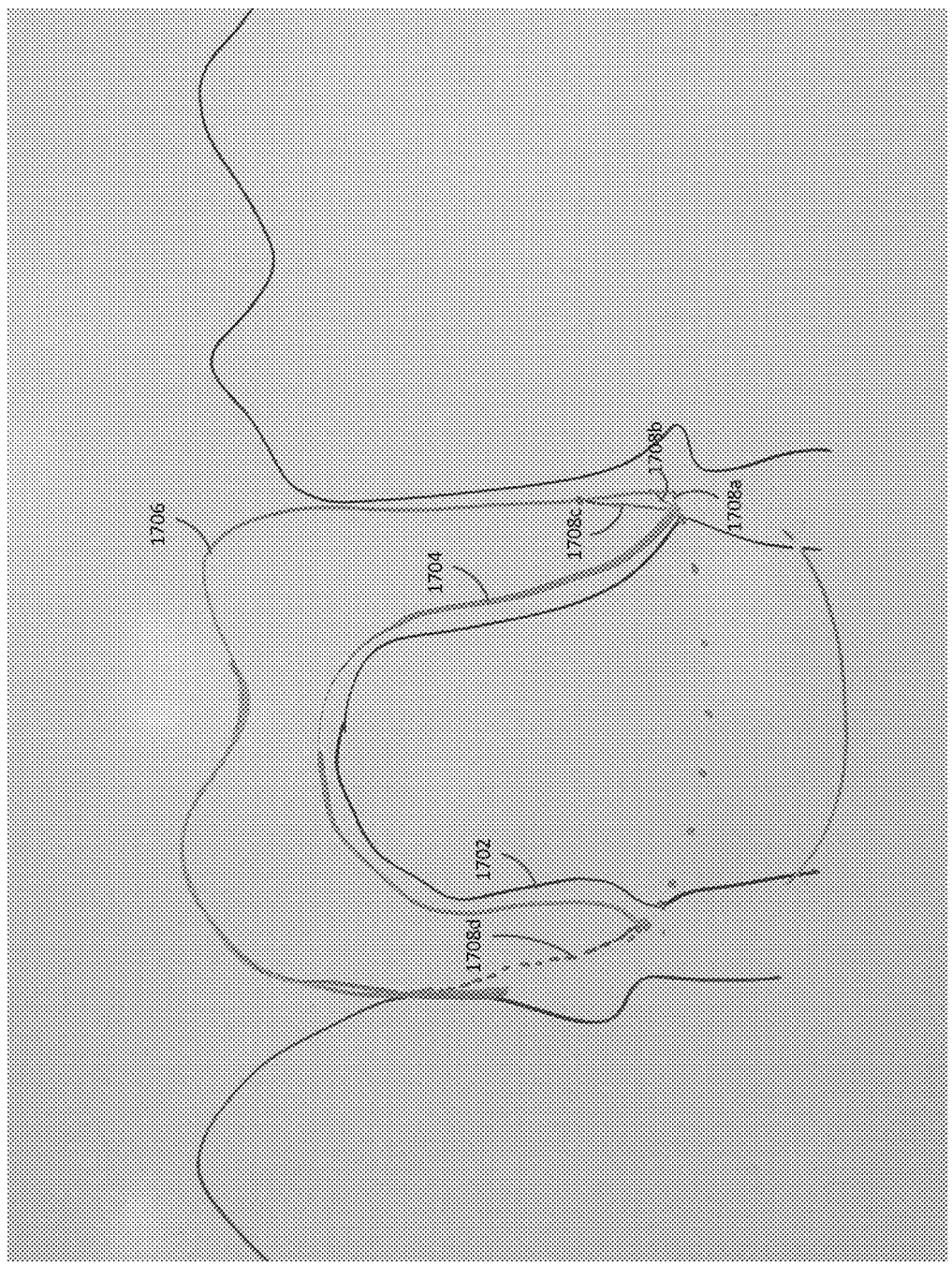
FIG. 17 is a diagram showing the curve aggressiveness and smoothness of the restoration model according to one embodiment.

Referring now to FIG. 17, a diagram 1700 showing the curve aggressiveness and smoothness of the restoration is illustrated according to one embodiment. Element 1702 represents a prepared tooth. Elements 1704, 1706 represent the inner surface and outer surface of a crown, respectively. By defining different links between the lower ends of the inner surface and outer surface, a crown with different curve aggressiveness can be created. In the illustrated embodiment, different links 1708a, 1708b, 1708c, 1708d between the lower ends of the inner surface 1702 and the outer surface 1704 have different angles and lengths, and thus enable the curve of the lower portions of the crown to have different aggressiveness. For example, the link 1708a defines the most aggressive curve; the link 1708d defines the smoothest curve; and the links 1708b, 1708c defines curves with moderate aggressiveness indices.

Exemplary Dental Restoration Design System

Figure 18:
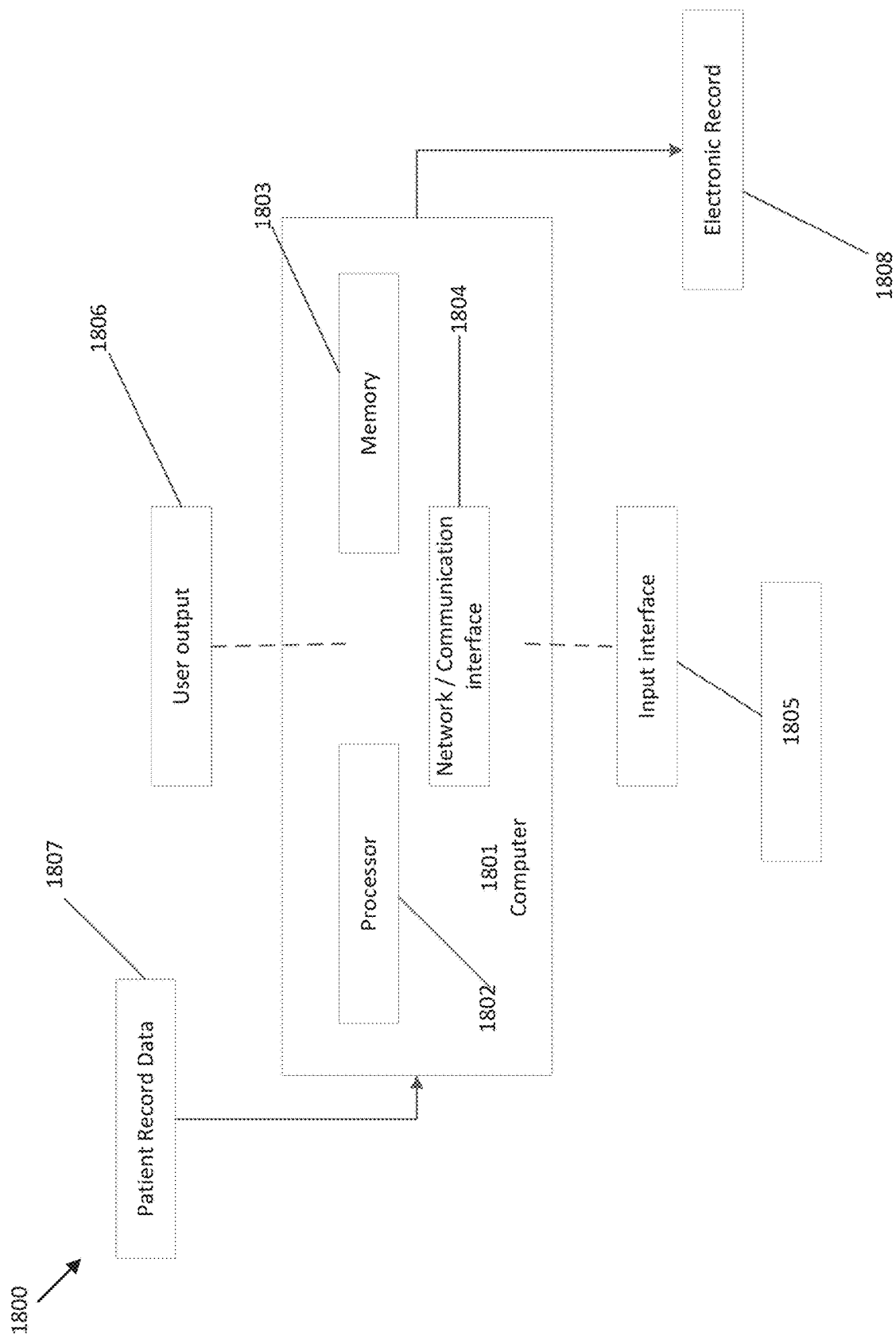
FIG. 18 is a block diagram of a dental restoration design system according to one embodiment.

Referring now to FIG. 18, a simplified block diagram of a dental restoration design system 1800 is described according to one embodiment. The system 1800 typically includes a computer 1801, which may comprise a microprocessor, integrated circuit, or other suitable computing device. The computer 1801 typically includes a processor 1802, a memory 1803, and a network or communication interface 1804. The processor 1802 communicates with a number of peripheral devices, including the memory 1803 and the communication interface 1804. The communication interface 1804 provides the capability of transmitting information over a communication network or other data processing systems. An input interface or module 1805 is electronically connected to the computer 1801. The input interface 1805 may comprise a keyboard, mouse, touch screen, stylus pad, foot pedal, joy stick, or other suitable user input interface. Other types of user interface input devices, such as voice recognition systems, may also be used. A user interface output device, such as a monitor 1806, is also provided. The interface output device may also include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

The memory 1803 maintains the basic programming, commands, and other software that provide the functionality of the system 1800. The memory 1803 typically includes a number of memories including a main random access memory (RAM) for storage of instructions and data during program execution and a read only memory (ROM) in which fixed instructions are stored. A file storage subsystem may provide persistent (nonvolatile) storage for program and data files, and typically includes at least one hard disk drive and at least one floppy disk drive (with associated removable media). There may also be other devices such as a CD ROM drive and optical drives (all with their associated removable media). Additionally, the system may include drives of the type with removable media cartridges. The removable media cartridges may, for example be hard disk cartridges or flexible disk cartridges. One or more of the drives may be located at a remote location, such as in a server on a local area network, in a cloud data center, or at a site on the Internet's World Wide Web.

Data in the form of a patient record 1807 is delivered to the dental restoration system computer 1801. In some embodiments, the patient record 1807 includes identification information and an electronic dental model of the patient's dentition, as described above. Once the restoration is designed, data in the form of an electronic record 1808 that includes the restoration design is delivered to a fabrication system, such as a mill, as described more fully below.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method of designing a dental restoration at a display, the method comprising:
   providing a virtual three dimensional representation of at least a portion of a patient's dental situation;
   displaying, on the display, a virtual three dimensional dental restoration model in an alignment with the virtual three dimensional representation;
   providing a design tool selectable to deform the shape of at least a portion of the three dimensional dental restoration model;
   wherein the design tool, when selected, enables a line to be drawn on a surface of the three dimensional dental restoration model, and
   wherein a surrounding area is indicated along with the line drawn on the surface of the three dimensional dental restoration model,
   wherein the three dimensional dental restoration model is of a restoration selected from the group consisting of a crown, an inlay, onlay, bridge, dental implant, or veneer.

2. The method of claim 1, wherein the surrounding area covers at least a portion of the three dimensional dental restoration model.

3. The method of claim 2, wherein each point of the line is usable by a user to move the line to deform the portion of the three dimensional dental restoration model.

4. The method of claim 3, wherein the line enables a user to pull the line outward from the surface of the three dimensional dental restoration model to expand the portion of the three dimensional dental restoration model.

5. The method of claim 3, wherein the line enables a user to bring the line inward of the surface of the three dimensional dental restoration model to dent the portion of the three dimensional dental restoration model.

6. The method of claim 3, wherein a point at one end portion of the line, when used by a user to move the line, causes a deformation of the portion of the three dimensional dental restoration model covered by the surrounding area, and wherein the deformation occurs mostly in amount at the portion that surrounds this end portion of the line.

7. The method of claim 3, wherein a point at the middle of the line, when used by a user to move the line, causes a deformation that occurs equally in amount at the whole portion covered by the surrounding area of the line.

8. The method of claim 1, wherein the dental restoration model includes one or more of a posterior model and an anterior model.

9. A system for designing a dental restoration at a display, the system comprising:
   a processor; and
   a non-transitory computer-readable storage medium comprising instructions executable by the processor to perform steps comprising:
      providing a virtual three dimensional representation of at least a portion of a patient's dental situation;
      displaying, on the display, a virtual three dimensional dental restoration model in an alignment with the virtual three dimensional representation;
      providing a design tool selectable to deform the shape of at least a portion of the three dimensional dental restoration model,
   wherein the design tool, when selected, enables a line to be drawn on a surface of the three dimensional dental restoration model, and
   wherein a surrounding area is indicated along with the line drawn on the surface of the three dimensional dental restoration model
   wherein the three dimensional dental restoration model is of a restoration selected from the group consisting of a crown, an inlay, inlay, bridge, dental implant, or veneer.

* * * * *